United States Patent
Fang et al.

(10) Patent No.: US 11,575,844 B2
(45) Date of Patent: *Feb. 7, 2023

(54) MULTI-APERTURE IMAGING SYSTEM AND APPLICATION THEREOF

(71) Applicant: NINGBO SUNNY OPOTECH CO., LTD., Ningbo (CN)

(72) Inventors: Yinli Fang, Ningbo (CN); Mingzhu Wang, Ningbo (CN); Lifeng Yao, Ningbo (CN); Zhenyu Chen, Ningbo (CN); Ang Ji, Ningbo (CN); Yurong Wu, Ningbo (CN)

(73) Assignee: NINGBO SUNNY OPOTECH CO., LTD., Zhejiang Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,682

(22) Filed: Jan. 25, 2021

(65) Prior Publication Data

US 2021/0211584 A1 Jul. 8, 2021

Related U.S. Application Data

(63) Continuation of application No. 16/734,374, filed on Jan. 5, 2020, now Pat. No. 10,944,915.

(51) Int. Cl.
*H04N 5/247* (2006.01)
*H04N 5/20* (2006.01)
*H04N 5/225* (2006.01)

(52) U.S. Cl.
CPC ........... *H04N 5/247* (2013.01); *H04N 5/2252* (2013.01); *H04N 5/2253* (2013.01); *H04N 5/2254* (2013.01); *H04N 5/2257* (2013.01)

(58) Field of Classification Search
None
See application file for complete search history.

(56) References Cited

U.S. PATENT DOCUMENTS 6,167,206 A * 12/2000 Hylen ............... G03B 1/48
396/316
6,377,404 B1 * 4/2002 Goosey, Jr. ............ G02B 13/04
359/691

(Continued)

FOREIGN PATENT DOCUMENTS

CA 2310114 A1 * 8/1999 ............ G02B 27/01
CA 2268494 A1 * 10/1999 ............... G02B 6/08

(Continued)

*Primary Examiner* — Reza Aghevli
(74) *Attorney, Agent, or Firm* — Wenderoth, Lind & Ponack, L.L.P.

(57) ABSTRACT

A multi-aperture imaging system and application thereof are provided. The multi-aperture imaging system includes a long-focal length camera module, a mid-focal length camera module and a wide-angle camera module. The long-focal length camera module has a field of view-FOV3. The mid-focal length camera module has a field of view-FOV2. The wide-angle camera module has a field of view-FOV1. They satisfy the condition of FOV1>FOV2>FOV3. Besides, a portion of the field of view area of FOV1 is covered by a portion of the field of view area of FOV2, while a portion of the field of view area of FOV2 is covered by a portion of the field of view area of FOV3, so as to enable a better zooming performance.

22 Claims, 15 Drawing Sheets

(56) References Cited

U.S. PATENT DOCUMENTS

| | | | | |
|---|---|---|---|---|
| 7,391,966 B2* | 6/2008 | Hylen | ................... | G03B 3/10 |
| | | | | 396/89 |
| 2007/0014560 A1* | 1/2007 | Hylen | ................... | G03B 13/32 |
| | | | | 396/124 |
| 2008/0218611 A1* | 9/2008 | Parulski | ........... | H04N 5/232123 |
| | | | | 348/262 |
| 2008/0218612 A1* | 9/2008 | Border | ................ | H04N 5/2226 |
| | | | | 348/262 |
| 2008/0218613 A1* | 9/2008 | Janson | ................ | H04N 5/2258 |
| | | | | 348/262 |
| 2008/0219654 A1* | 9/2008 | Border | ................ | H04N 5/2258 |
| | | | | 396/89 |
| 2011/0261175 A1* | 10/2011 | Fomitchov | ........... | A61B 5/0071 |
| | | | | 348/61 |
| 2015/0145980 A1* | 5/2015 | Bryll | ................... | G02B 21/241 |
| | | | | 348/79 |
| 2018/0143419 A1* | 5/2018 | Bryll | ................... | G02F 1/113 |
| 2019/0329721 A1* | 10/2019 | Okuda | ................... | G02B 13/02 |

FOREIGN PATENT DOCUMENTS

| | | | | |
|---|---|---|---|---|
| CA | 2776223 A1 * | 4/2011 | ........... | A61B 3/0033 |
| WO | WO-2005043231 A2 * | 5/2005 | ........... | G06F 3/0426 |
| WO | WO-2021005711 A * | 1/2021 | ............... | G02B 7/08 |
| WO | WO-2021005711 A1 * | 1/2021 | ............. | G03B 21/00 |

* cited by examiner

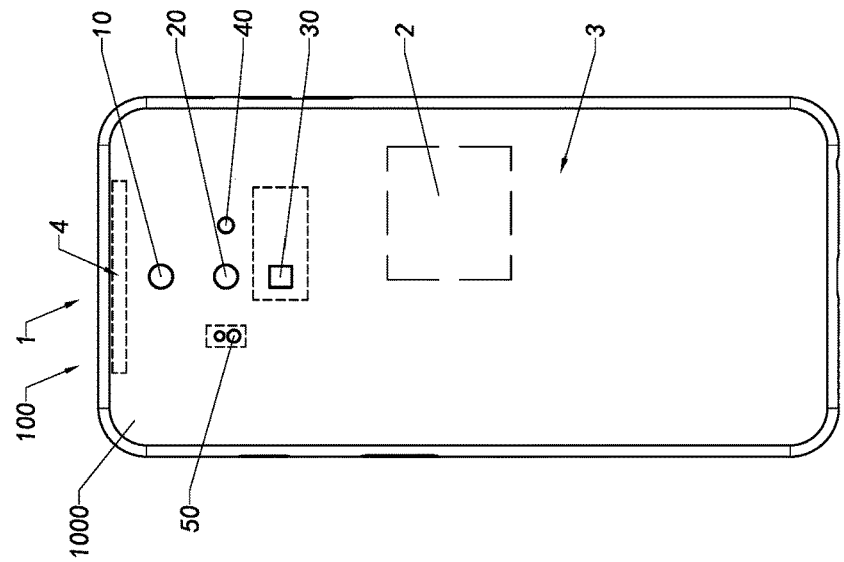
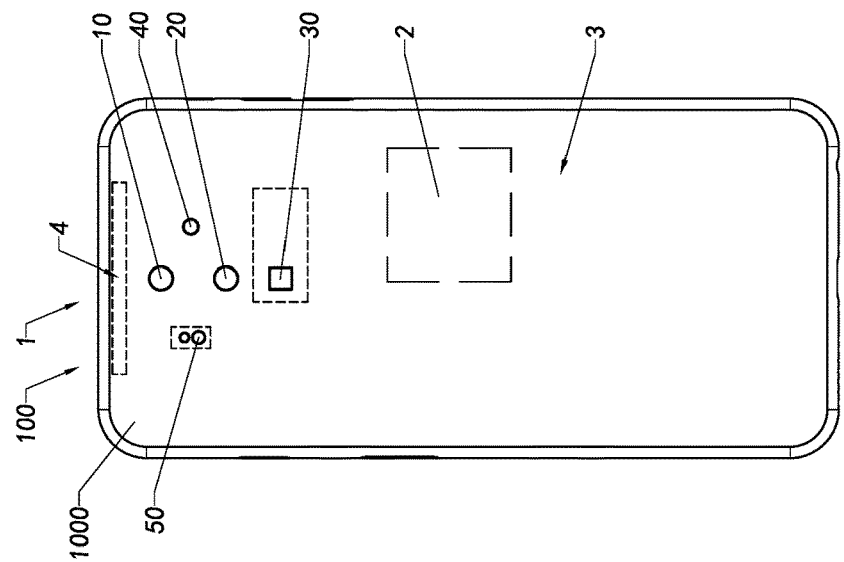
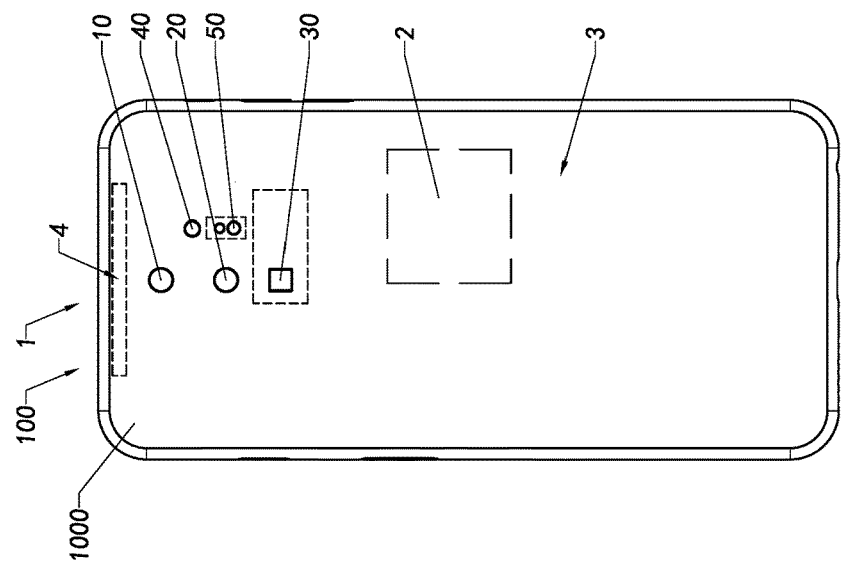

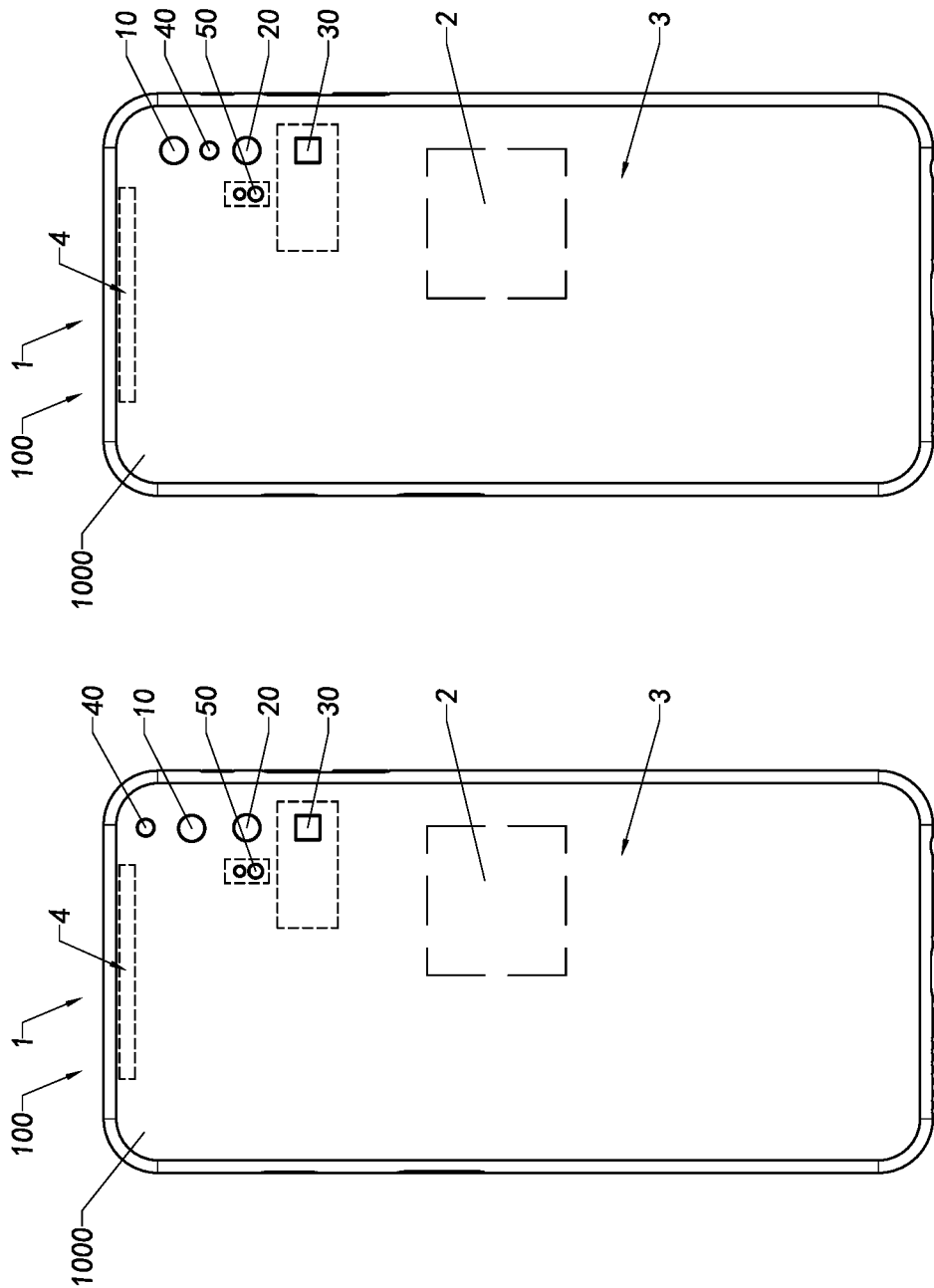

MULTI-APERTURE IMAGING SYSTEM AND APPLICATION THEREOF

CROSS REFERENCE OF RELATED APPLICATION

This application is a Continuation application that claims the benefit of priority under 35 U.S.C. § 120 to a non-provisional application, application number Ser. No. 16/734,374, filed Jan. 5, 2020, which is incorporated herewith by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of optical imaging, and, in particular, to a multi-aperture imaging system and application thereof.

Description of Related Arts

Modern electronic products have been designed to be smaller and smaller due to the trend of pursuing compact technical products. The consumers also demand more and more on cameras that are integrated in electronic products like cell phones and music players. A mobile electronic product that provides similar photographing experience as a single lens reflex camera is an expectation to the consumers. Optical zooming is a critical performance and feature for a single lens reflex camera. Nevertheless, this feature may not be directly adopted by camera integrated on a mobile electronic product.

Specifically speaking, the mechanical zooming solution for single lens reflex camera is limited in compact mobile electronic products. If such solution is utilized, the height of the camera of the mobile electronic products will make the entire produce look very thick and heavy.

Another solution is to obtain desired zooming ratio by cropping and interpolating the image through software processing, which is the digital zooming solution. Unfortunately, images obtained in this means may end up having blurring imaging result during an enlarging process.

Another way to implement zooming is to utilize at least two apertures imaging processing system. A basic form of such imaging system can use at least two camera modules to capture the image of the target object collaboratively. Because the focal lengths of the camera modules are different, it can obtain images of different depths of field. Then, it can achieve the zooming of the entire imaging processing system through switching between different camera modules during the image capture and by the stored software algorithm, which does not require change of the focal lengths of the camera modules and therefore allows the entire imaging processing system having a smaller size.

In other words, each of the camera modules has a different field of view, such that it may utilize multiple camera modules and digital zooming to simulate optical zooming. It is understood that there are overlapped portions for the fields of view of different camera modules because image information of the target object captured through different camera modules may also have overlapping portions. Then, an image with diverse depths of field can be produced through software algorithm processing.

Along with the market demand for zooming ratio, the focal length of a long-focal length camera module of the imaging processing system with at least two apertures has become longer and longer. Nevertheless, it brings a challenge of arranging the positions of the camera modules of the entire imaging processing system while ensuring the high optical zooming performance at the same time, so as to collect enough information of the same target object and obtain an imaging processing system of higher definition and smoother switching between camera modules of various zooming ratios. This issue can be more complicated especially when there are multiple camera modules.

SUMMARY OF THE PRESENT INVENTION

An object of the present invention is to provide a multi-aperture imaging system and application thereof, wherein the multi-aperture imaging system comprises a plurality of camera modules of various focal lengths, wherein each of the camera modules is arranged at a predetermined position so as to provide a better imaging performance.

Another object of the present invention is to provide a multi-aperture imaging system and application thereof, wherein each of the camera modules has a designated position according to its focal length and field of view, so as to provide a smooth experience in the process of switching among various focal lengths.

Another object of the present invention is to provide a multi-aperture imaging system and application thereof, wherein the multi-aperture imaging system comprises a plurality of camera modules of various focal lengths, wherein each of the camera modules is arranged at a predetermined position, such that the scopes of the fields of view taken by the camera modules are more coincided and overlapped with one another, which enhances the photographing performance of the coordination between two of the camera modules.

Another object of the present invention is to provide a multi-aperture imaging system and application thereof, wherein one of the camera modules that has the largest focal length is a periscope camera module, which not only enables long zoom of the device, but also keeps the entire imaging system a relatively compact size.

Another object of the present invention is to provide a multi-aperture imaging system and application thereof, wherein one of the camera modules is a mid-focal length camera module, wherein a field of view of the periscope camera module is arranged to be close to a field of view of the mid-focal length camera module, such that the imaging centers of the periscope camera module and the mid-focal length camera module are closer.

Another object of the present invention is to provide a multi-aperture imaging system and application thereof, wherein one of the camera modules is a mid-focal length camera module, wherein a field of view of the periscope camera module is arranged to be close to a field of view of the mid-focal length camera module, so as to smooth the focal length change of the switching from the mid-focal length camera module to the periscope camera module.

Another object of the present invention is to provide a multi-aperture imaging system and application thereof, wherein one of the camera modules is a mid-focal length camera module, wherein a field of view of the periscope camera module is arranged to be close to a field of view of the mid-focal length camera module, so as to enhance the photographing performance through coordinating the periscope camera module and the mid-focal length camera module.

Another object of the present invention is to provide a multi-aperture imaging system and application thereof, wherein a field of view of the wide-angle camera module is arranged close to a field of view of the mid-focal length camera module, so as to smooth the focal length switch from the wide-angle camera module to the mid-focal length camera module.

Another object of the present invention is to provide a multi-aperture imaging system and application thereof, wherein the camera modules are connected through at least one connector so as to reduce the installation space of the multi-aperture imaging system occupied in the electronic device.

Another object of the present invention is to provide a multi-aperture imaging system and application thereof, wherein a connector of the periscope camera module is arranged at a predetermined position, so as to achieve a better photographing performance of the periscope camera module.

Another object of the present invention is to provide a multi-aperture imaging system and application thereof, wherein a connector of the periscope camera module is arranged at an end of a photosensitive component of the periscope camera module, so as to achieve a better photographing performance of the periscope camera module.

Another object of the present invention is to provide a multi-aperture imaging system and application thereof, wherein one of the camera modules is a wide-angle camera module, wherein the periscope camera module provides an installation space for the wide-angle camera module so as to lower the mounting height.

Another object of the present invention is to provide a multi-aperture imaging system and application thereof, wherein the wide-angle camera module can be partially overlapped with a connection element of the periscope camera module, so as to reduce a height and an area size of the imaging system.

Another object of the present invention is to provide a multi-aperture imaging system and application thereof, wherein the multi-aperture imaging system is installed in an electronic device and has a specific installation site in the electronic device, so as to perform a better photographing performance.

Another object of the present invention is to provide a multi-aperture imaging system and application thereof, wherein the multi-aperture imaging system is installed in an electronic device and has a specific installation site in the electronic device, so as to allow the electronic device to have more space available for installing other components.

According to an aspect of the present invention, a multi-aperture imaging system is provided, which comprises:

a long-focal length camera module, a mid-focal length camera module and a wide-angle camera module, wherein the long-focal length camera module has a field of view: FOV3, wherein the mid-focal length camera module has a field of view: FOV2, wherein the wide-angle camera module has a field of view: FOV1, wherein each of the fields of view, FOV1, FOV2, FOV3 is angular field of view.

FOV1>FOV2>FOV3 and a portion of the field of view area of the FOV1 is covered and included by a portion of the field of view area of the FOV2, while a portion of the field of view area of the FOV2 is covered and included by a portion of the field of view area of the FOV3.

According to an embodiment of the present invention, the FOV1, the FOV2, and the FOV3 respectively satisfy the following conditions:

$$10°≤FOV3≤40°, 25°≤FOV2≤90°, \text{ and } 50°≤FOV1≤180°.$$

According to one embodiment of the present invention, the field of view area of the FOV3 for the portion 5 cm from an end surface of a lens of the long-focal length camera module is at least partially covered and included by the field of view area of the FOV2.

According to one embodiment of the present invention, a center of the section of the field of view area of the mid-focal length camera module that is ≥20 cm from an end surface of a lens of the long-focal length camera module coincides with a center of the section of the field of view area of the long-focal length camera module.

According to one embodiment of the present invention, the radius of the field of view area of the mid-focal length camera module that is ≥20 cm from an end surface of a lens of the long-focal length camera module is R2 and the distance between an optical axis of the mid-focal length camera module and an optical axis of the long-focal length camera module is I2, wherein I2/R2≤0.125.

According to one embodiment of the present invention, the distance between an optical axis of the mid-focal length camera module and an optical axis of the long-focal length camera module is I2, wherein 1 cm≤I2≤3 cm.

According to one embodiment of the present invention, the field of view area of the FOV2 for the portion more than 3 cm from an end surface of a lens of the mid-focal length camera module is at least partially covered and included by the field of view area of the FOV1.

According to one embodiment of the present invention, the center of the section of the field of view area of the wide-angle camera module that is ≥10 cm from an end surface of a lens of the mid-focal length camera module coincides with the center of the section of the field of view area of the mid-focal length camera module.

According to one embodiment of the present invention, the radius of the field of view area of the wide-angle length camera module that is ≥10 cm from an end surface of a lens of the long-focal length camera module is R1 and the distance between an optical axis of the mid-focal camera module and an optical axis of the wide-angle camera module is I1, wherein I1/R1≤0.125.

According to one embodiment of the present invention, the ratio of the equivalent focal lengths of the long-focal length camera module and the wide-angle camera module is ≥4.

According to one embodiment of the present invention, the ratio of the equivalent focal lengths of the long-focal length camera module and the wide-angle camera module is ≥5.

According to one embodiment of the present invention, the ratio of the equivalent focal lengths of the mid-focal length camera module and the wide-angle camera module is ≥3.

According to one embodiment of the present invention, the long-focal length camera module comprises a third camera body, a third connection element and a third connector, wherein the third connection element is arranged between the third camera body and the third connector and respectively electrically connected with the third camera body and the third connector, wherein the third camera body comprises a third lens unit and a third photosensitive component, wherein light reaches the third photosensitive component through the third lens unit, wherein the third connection element is arranged at an end of the third photosensitive component of the long-focal length camera module and is electrically connected with the third lens unit and the third photosensitive component.

According to one embodiment of the present invention, the long-focal length camera module comprises a third camera body, a third connection element and a third connector, wherein the third connection element is arranged between the third camera body and the third connector and electrically connected with the third camera body and the third connector, wherein the third camera body comprises a third lens unit and a third photosensitive component, wherein light reaches the third photosensitive component through the third lens unit, wherein the third connection element is arranged at an end of the third lens unit of the long-focal length camera module and is electrically connected with the third lens unit and the third photosensitive component.

According to one embodiment of the present invention, the mid-focal length camera module is arranged closer to the light opening of the long-focal length camera module than the wide-angle camera module.

According to an embodiment of the present invention, the mid-focal length camera module comprises a second camera body, a second connection element and a second connector, wherein the second connection element is arranged between the second camera body and the second connector and electrically connected with the second camera body and the second connector respectively, wherein the wide-angle camera module comprises a first camera body, a first connection element, and a first connector, wherein the first connection element is arranged between the first camera body and the first connector and electrically connected with the first camera body and the first connector respectively, wherein the first camera body of the wide-angle camera module is at least partially overlapped with a front side of the second connection element of the mid-focal length camera module or at least partially overlapped with a front side of the third connection element of the long-focal length camera module.

According to one embodiment of the present invention, the long-focal length camera module, the mid-focal length camera module and the wide-angle camera module share at least a connection element and at least a connector.

According to one embodiment of the present invention, a flash is further provided, wherein the distance between the flash and the wide-angle camera module is shorter than the distance between the flash and the long-focal length camera module, wherein the distance between the flash and the mid-focal length camera module is shorter than the distance between the flash and the long-focal length camera module.

According to one embodiment of the present invention, the flash is arranged at a middle position between the wide-angle camera module and the mid-focal length camera module.

According to one embodiment of the present invention, the long-focal length camera module is a periscope camera module.

According to another aspect of the present invention, a mobile electronic device is provided, which comprises an electronic device body and a multi-aperture imaging system as mentioned above, wherein the multi-aperture imaging system is communicationally connected with the electronic device body.

According to another aspect of the present invention, a mobile electronic device is provided, which comprises:

an electronic device body having a back side; and a multi-aperture imaging system, comprising a long-focal length camera module, a mid-focal length camera module and a wide-angle camera module, wherein the long-focal length camera module, the mid-focal length camera module, and the wide-angle camera module are respectively arranged on the back side of the electronic device body, wherein the long-focal length camera module is a periscope camera module.

According to one embodiment of the present invention, the wide-angle camera module, the mid-focal length camera module, and the periscope camera module are arranged on the electronic device body along the width direction thereof.

According to one embodiment of the present invention, a light opening of the wide-angle camera module, a light opening of the mid-focal length camera module, and a light opening of the periscope camera module are at the same axial line.

According to one embodiment of the present invention, the periscope camera module is laterally arranged on the electronic device body.

According to one embodiment of the present invention, the periscope camera module is longitudinally arranged on the electronic device body.

According to one embodiment of the present invention, the multi-aperture imaging system further comprises a flash, wherein the flash, the wide-angle camera module, and the mid-focal length camera module are positioned at the same axial line.

According to one embodiment of the present invention, the wide-angle camera module, the mid-focal length camera module, and the periscope camera module are arranged on the electronic device body along the length direction thereof.

According to one embodiment of the present invention, the periscope camera module is laterally arranged on the electronic device body.

According to one embodiment of the present invention, the length direction of a photosensitive element of the wide-angle camera module, the length direction of a photosensitive element of the mid-focal length camera module, and the length direction of a photosensitive element of the long-focal length camera module are respectively parallel to the length direction of the electronic device body, wherein the plane of a photosensitive element of the long-focal length camera module is perpendicular to the plane of the electronic device body.

According to one embodiment of the present invention, a front camera module is arranged on the front side of the electronic device body, wherein the multi-aperture imaging system is positioned below the front camera module.

According to one embodiment of the present invention, the axial line where the light openings of the wide-angle camera module, the mid-focal length camera module, and the periscope camera module are arranged at a middle position of the electronic device body along the width direction thereof.

According to one embodiment of the present invention, the axial line where the light openings of the wide-angle camera module, the mid-focal length camera module, and the periscope camera module are arranged on the side edge of the front camera module.

According to one embodiment of the present invention, the multi-aperture imaging system further comprises a flash arranged on the electronic device body, wherein the distance between the flash and the wide-angle camera module is shorter than the distance between the flash and the long-focal length camera module, wherein the distance between the flash and the mid-focal length camera module is shorter than the distance between the flash and the long-focal length camera module.

According to one embodiment of the present invention, the flash is arranged at a middle position between the wide-angle camera module and the mid-focal length camera module.

According to one embodiment of the present invention, the long-focal length camera module has a field of view: FOV3, wherein the mid-focal length camera module has a field of view: FOV2, wherein the wide-angle camera module has a field of view: FOV1, wherein FOV1>FOV2>FOV3 and a portion of the field of view area of the FOV1 is covered by a portion of the field of view area of the FOV2, while a portion of the field of view area of the FOV2 is covered by a portion of the field of view area of the FOV3.

According to another aspect of the present invention, a multi-aperture imaging system is provided, which comprises:

a long-focal length camera module and a wide-angle camera module, wherein the long-focal length camera module has a field of view FOV3 and the wide-angle camera module has a field of view FOV1, wherein FOV1>FOV3 and a portion of the field of view area of the FOV1 is covered by a portion of the field of view area of the FOV3, wherein the long-focal length camera module is a periscope camera module.

According to one embodiment of the present invention, each of the FOV1 and the FOV3 satisfies the following conditions:

$$10°≤FOV3≤40° \text{ and } 50°≤FOV3≤180°.$$

According to one embodiment of the present invention, the field of view area of the FOV3 for the portion more than 2 cm from an end surface of a lens of the long-focal length camera module is at least partially covered by the field of view area of the FOV1.

According to one embodiment of the present invention, the center of the section of the field of view area of the wide-angle camera module that is ≥10 cm from an end surface of a lens of the long-focal length camera module coincides and overlaps the center of the section of the field of view area of the long-focal length camera module.

According to one embodiment of the present invention, the radius of the field of view area of the wide-angle camera module that is ≥10 cm from an end surface of a lens of the long-focal length camera module is R3 and the distance between an optical axis of the mid-focal length camera module and an optical axis of the wide-angle camera module is I3, wherein $I3/R3≤0.125$.

According to one embodiment of the present invention, the long-focal length camera module comprises a third camera body, a third connection element and a third connector, wherein the third connection element is arranged between the third camera body and the third connector and respectively electrically connected with the third camera body and the third connector, wherein the third camera body comprises a third lens unit and a third photosensitive component, wherein light reaches the third photosensitive component through the third lens unit, wherein the third connection element is arranged at an end of the third photosensitive component of the long-focal length camera module and is electrically connected with the third lens unit and the third photosensitive component.

According to one embodiment of the present invention, the long-focal length camera module comprises a third camera body, a third connection element and a third connector, wherein the third connection element is arranged between the third camera body and the third connector and electrically connected with the third camera body and the third connector, wherein the third camera body comprises a third lens unit and a third photosensitive component, wherein light reach the third photosensitive component through the third lens unit, wherein the third connection element is arranged at an end of the third lens unit of the long-focal length camera module and is electrically connected with the third lens unit and the third photosensitive component.

According to one embodiment of the present invention, the wide-angle camera module comprises a first camera body, a first connection element and a first connector, wherein the first connection element is arranged between the first camera body and the first connector and electrically connected with the first camera body and the first connector respectively, wherein the first camera body of the wide-angle camera module is at least partially overlapped with a front side of the third connection element of the long-focal length camera module.

According to one embodiment of the present invention, the first connector and the third connector are the same connector.

According to another aspect of the present invention, a mobile electronic device is provided, which comprises an electronic device body and a multi-aperture imaging system as mentioned above, wherein the multi-aperture imaging system is communicationally connected with the electronic device body.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 8A is a plane view of an electronic device, illustrating a first alternative arrangement of the multi-aperture imaging system, according to the above preferred embodiment of the present invention.

FIG. 8B is a plane view of an electronic device, illustrating a second alternative arrangement of the multi-aperture imaging system, according to the above preferred embodiment of the present invention.

FIG. 8C is a plane view of an electronic device, illustrating a third alternative arrangement of the multi-aperture imaging system, according to the above preferred embodiment of the present invention.

FIG. 10A is a plane view of an electronic device, illustrating a sixth alternative arrangement of the multi-aperture imaging system, according to the above preferred embodiment of the present invention.

FIG. 10B is a plane view of an electronic device, illustrating a seventh alternative arrangement of the multi-aperture imaging system, according to the above preferred embodiment of the present invention.

DETAILED DESCRIPTION OF THE PREFERRED EMBODIMENT

Figure 1A:
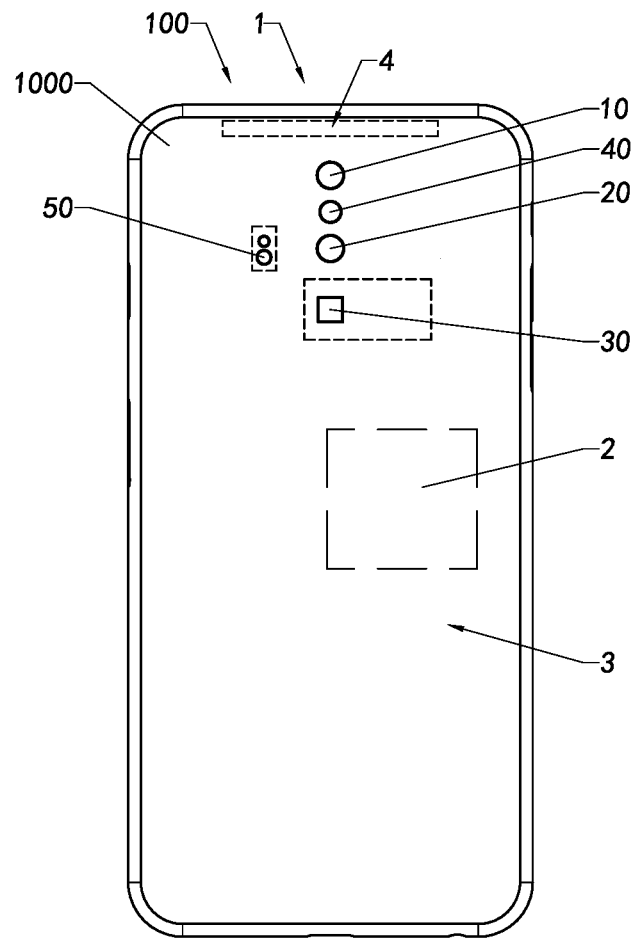
FIG. 1A is a plane view of an electronic device having a multi-aperture imaging system according to a preferred embodiment of the present invention.

The following description is disclosed to enable any person skilled in the art to make and use the present invention. Preferred embodiments in the following descriptions are to give examples only. Those skilled in the art can think of other obvious modifications. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and more that indicate relations of direction or position are based on the relations of direction or position shown in the appended drawings, which is only for ease of describing the present invention and simplifying the description, rather than to indicate or imply that the referred device or element has to apply specific direction or to be operated or structured in specific direction. Therefore the above-mentioned terminologies shall not be interpreted as confine to the present invention.

It is understandable that terminologies of "a" or "an" should be interpreted as "at least one" or "one or more." In other words, in one embodiment, the quantity of an element can be one, but in another embodiment, the quantity of the element can be several. Hence, the terminologies of "a" or "an" shall not be considered as a limit of quantity.

FIGS. 1A, 1B, 2A, 2B, and 3 illustrate a multi-aperture imaging system 1 and an electronic device 100 with the multi-aperture imaging system installed in the electronic device 100 according to a preferred embodiment of the present invention.

The electronic device 100 comprises an electronic device body 1000 and the multi-aperture imaging system 1, wherein the multi-aperture imaging system 1 is arranged and mounted on the electronic device body 1000 so as for capturing the image of the target object.

According to this preferred embodiment, the multi-aperture imaging system 1 comprises a wide-angle camera module 10, a mid-focal length camera module 20 and a long-focal length camera module 30, wherein the long-focal length camera module 30, the mid-focal length camera module 20 and the wide-angle camera module 10 can be operated coordinately, so as to achieve photographing performances of various depths of field through the focal lengths of the long-focal length camera module 30, the mid-focal length camera module 20 and the wide-angle camera module 10.

The electronic device body 1000 comprises a processing unit 2 and a display unit 3, wherein the processing unit 2 is communicationally connected with the display unit 3 and the multi-aperture imaging system 1 is operationally connected with the processing unit 2.

The processing unit 2 is electrically connected with the display unit 3 and operationally connected with the multi-aperture imaging system 1. The processing unit 2 is pre-loaded with software algorithm in order to control the switches among different focal lengths of the multi-aperture imaging system 1. Preferably, the display unit 3 is a touch screen that the user may directly communicate with the multi-aperture imaging system 1 or control the operation of the multi-aperture imaging system 1, by means of the display unit 3. The image information regarding the target object captured by multi-aperture imaging system 1 can be directly displayed on the display unit 3.

The electronic device body 1000 further comprises a front camera module 4, positioned on a front side of the electronic device body 1000 so as to face the user. The user may utilize the front camera module 4 for self-portrait and etc.

It is worth noticing that the optical zooming of the multi-aperture imaging system 1 does not require any changes of the focal lengths of the wide-angle camera module 10, the mid-focal length camera module 20 and the long-focal length camera module 30. Rather, it coordinately utilizes the wide-angle camera module 10, the mid-focal length camera module 20 and the long-focal length camera module 30 to obtain different information of the target object. During the photographing process, it relies on switching among the wide-angle camera module 10, the mid-focal length camera module 20 and the long-focal length camera module 30 as well as the software algorithm loaded in the processing unit 2 so as to achieve the zooming of the multi-aperture imaging system 1 as a whole. This means that the multi-aperture imaging system 1 does not have to reserve internal space for zooming shifts, so that the multi-aperture imaging system 1 can be made further smaller in size.

It is worth mentioning that, for the multi-aperture imaging system 1, the wide-angle camera module 10 has a field of view: FOV1, the mid-focal length camera module 20 has a field of view: FOV2, and the long-focal length camera module 30 has a field of view: FOV3, wherein FOV1>FOV2>FOV3, wherein each of the field of views, FOV1, FOV2, FOV3, is angular field of view as shown in FIGS. 2A and 2B.

Figure 2A:
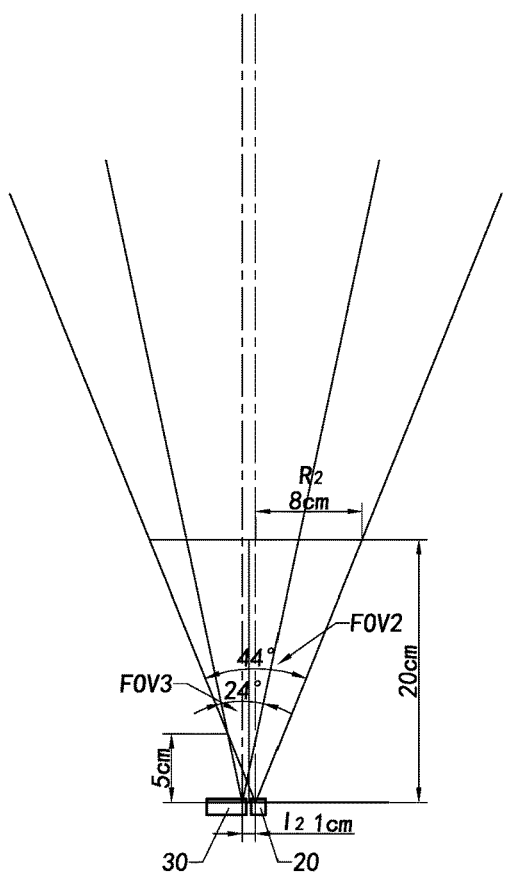
FIG. 2A is a schematic view of the multi-aperture imaging system according to the above preferred embodiment of the present invention.
Figure 2B:
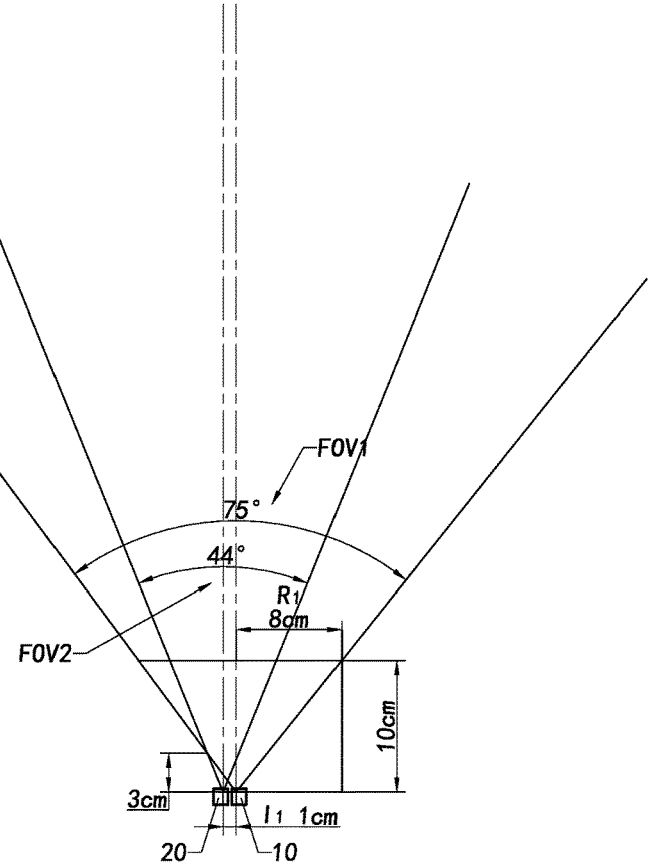
FIG. 2B is a schematic view of the multi-aperture imaging system according to the above preferred embodiment of the present invention.

According to the preferred embodiment, further referring to FIGS. 2A and 2B, a central position of the field of view FOV3 that is corresponding to the long-focal length camera module 30 is arranged adjacent to a central position of the field of view FOV2 that is corresponding to the mid-focal length camera module 20. In other words, most of the conical shaped field of view area formed by the field of view FOV3 that is corresponding to the long-focal length camera module 30 is covered by the conical shaped field of view area formed by the field of view FOV2 that is corresponding to the mid-focal length camera module 20, such that the scope of the field of view of the long-focal length camera module 30 and the scope of the field of view of the mid-focal length camera module 20 are overlapped as far as possible. Therefore, when shooting the same object, images of the object respectively captured by the long-focal length camera module 30 and the mid-focal length camera module 20 will have more areas overlapped with each other, that facilitates post processing, allows the images respectively captured by the two camera modules to be presented as one image on the display unit 3, and achieves a better photographing performance. Further, the central position of the field of view FOV2 that is corresponding to the mid-focal length camera module 20 is arranged adjacent to the central position of the field of view FOV1 that is corresponding to the wide-angle camera module 10. In other words, most of the conical shaped field of view area formed by the field of view FOV2 that is corresponding to the mid-focal length camera module 20 is covered by the conical shaped field of view area formed by the field of view FOV1 that is corresponding to the wide-angle camera module 10, such that the scope of the field of view of the mid-focal length camera module 20 and the scope of the field of view of the wide-angle camera module 10 are overlapped as far as possible. Therefore, when shooting the same object, images of the object respectively captured by the mid-focal length camera module 20 and the wide-angle camera module 10 will have more areas overlapped with each other, that facilitates post processing and allows the images respectively captured by the two camera modules to be presented as one image on the display unit 3.

For the multi-aperture imaging system 1, when the field of view FOV3 of the long-focal length camera module 30 is arranged adjacent to the field of view FOV2 of the mid-focal length camera module 20 and the field of view FOV2 of the mid-focal length camera module 20 is arranged adjacent to the field of view FOV1 of the wide-angle camera module 10, the focal length switching of the multi-aperture imaging system 1 can be smoother. For example, when it switches from a medium focal length to a relatively high focal length, because most of the conical shaped area of the field of view corresponding to the field of view FOV3 of the long-focal length camera module 30 is covered by the conical shaped area of the field of view corresponding to the field of view FOV2 of the mid-focal length camera module 20, the image information captured by the mid-focal length camera module 20 and the image information captured by the long-focal length camera module 30 have a larger overlapping information to help the switching between the two smoother. Similarly, when it switches from a lower focal length to a medium focal length, because most of the conical shaped area of the field of view corresponding to the field of view FOV2 of the mid-focal length camera module 20 is covered by the conical shaped area of the field of view corresponding to the field of view FOV1 of the wide-angle camera module 10, here for the same target object, the image captured by the mid-focal length camera module 20 and the image captured by the wide-angle camera module 10 have a large overlap area, so as to help the focal length switch and transient process from a focal length of the mid-focal length camera module 20 to a focal length of the wide-angle camera module 10 be more natural based on the support of more identical image information.

The mid-focal length camera module 20 is positioned adjacent to the long-focal length camera module 30 and the wide-angle camera module 10. Preferably, the mid-focal length camera module 20 is arranged closer to the long-focal length camera module 30 than the wide-angle camera module 10, that is helpful for the switching of high zooming ratio and the coordination of the mid-focal length camera module 20 and the long-focal length camera module 30 for photographing and producing a better photographing performance. Also, it facilitates a field of view area of the mid-focal length camera module 20 and the long-focal length camera module 30 which are arranged closer with each other to be covered and included by a field of view area provided by the wide-angle camera module.

According to some embodiments of the present invention, each of the FOV1, the FOV2, and the FOV3 satisfies the following conditions:

$$10°≤FOV3≤40°, 25°≤FOV2≤90°, \text{ and } 50°≤FOV1≤180°.$$

Alternatively, according to some embodiments of the present invention, specific installation sites for two camera modules are designed based on the sizes of the field of view FOV3 of the long-focal length camera module 30 and the field of view FOV2 of the mid-focal length camera module 20 as well as the field of view FOV1 of the wide-angle camera module 10 and the field of view FOV2 of the mid-focal length camera module 20. The conical shaped area of the field of view corresponding to the field of view FOV3 of the long-focal length camera module 30 is mostly covered and included by the conical shaped area of the field of view corresponding to the field of view FOV2 of the mid-focal length camera module 20, and the conical shaped area of the field of view corresponding to the field of view FOV2 of the mid-focal length camera module 20 is covered and included by the conical shaped area of the field of view corresponding to the field of view FOV1 of the wide-angle camera module 10. Besides, the conical shaped areas of the field of view FOV3 and the field of view FOV2 are partially overlapped for the positions ≥5 cm from the end surface of the lens, and the conical shaped areas of the field of view of FOV2 and the field of view FOV1 are partially overlapped for the positions ≥3 cm from the end surface of the lens.

Specifically speaking, according to some embodiments of the present invention, at a position distanced from an end surface of a lens of the long-focal length camera module 30 is no less than (≥) 5 cm, a field of view area of the field of view FOV3 of the long-focal length camera module 30 is completely covered and included by a field of view area of the field of view FOV2 of the mid-focal length camera module 20. Further, at a position distanced from the end surface of the lens of the long-focal length camera module 30 no less than (≥) 20 cm, a distance I2 is defined between the long-focal length camera module 30 and the mid-focal length camera module 20. A radius R2 of the field of view area of the field of view FOV2 of the mid-focal length camera module 20 at that position satisfies the following condition: I2/R2≤0.125.

It is worth mentioning that with respect to a position distanced from the end surface of the lens of the long-focal length camera module 30 no less than (≥) 20 cm, a center of a section of the field of view corresponding to the field of view FOV3 of the long-focal length camera module 30 and a center of a section of the field of view corresponded to the field of view FOV2 of the mid-focal length camera module 20 are becoming closer, such that, as the shooting distance increases, the centers of the shot images of the long-focal length camera module 30 and the mid-focal length camera module 20 can be closer so as to produce a better photographing performance with respect to the area of the section of the field of view corresponding to the center.

More specifically, as the distance from the end surface of the lens of the long-focal length camera module 30 increases, the section area of the field of view area of the long-focal length camera module 30 will also increase accordingly because, with respect to the long-focal length camera module 30, the area of the field of view of the long-focal length camera module 30 is in conical shape, and that the farther from the tip of the conical area of the field of view of the long-focal length camera module 30, the larger the corresponding section area of the field of view of the long-focal length camera module 30.

Correspondingly, a section of the field of view area of the mid-focal length camera module 20 will also be larger and larger because, with respect to the mid-focal length camera module 20, the area of the field of view of the mid-focal length camera module 20 is in conical shape, and that the farther from the tip of the conical shaped area of the field of view of the mid-focal length camera module 20, the larger the corresponding section area of the field of view of the mid-focal length camera module 20. Besides, the overlapping portion of the field of view areas of the long-focal length camera module 30 and the mid-focal length camera module 20 will be increasing in this manner as well.

Nevertheless, with respect to the long-focal length camera module 30 and the mid-focal length camera module 20, the distance between the centers of the sections of the field of view of the long-focal length camera module 30 and the field of view of the mid-focal length camera module 20 on the same plane stays unchanged because these centers are positioned at the optical axes that are parallel to each other. However, the distance between these centers may be considered shortened with respect to the expanded sections of the fields of view.

For example, when the radius R2 of the section of the field of view of the mid-focal length camera module 20 is 10 cm, the section of the field of view of the long-focal length camera module 30 will be covered and included by the section of the field of view of the mid-focal length camera module 20. That is, the radius of the section of the field of view of the long-focal length camera module 30 is less than 10 cm. Then, when the distance I2 between the two centers is 1 cm, the ratio of the center distance I2 and the radius R2 of the mid-focal length camera module 20 is 0.1. When the distance from the end surface of the lens of the long-focal length camera module 30 has been increased and the radius R2 of the section of the field of view of the mid-focal length camera module 20 is 20 cm at some position, the section of the field of view of the long-focal length camera module 30 will be covered and included by the section of the field of view of the mid-focal length camera module 20 and has a radius less than 20 cm. When the distance between the two centers is still 1 cm, the ratio of the center distance I2 and the radius R2 of the mid-focal length camera module 20 is 0.05.

In other words, as the distance increases, with respect to the entire field of view area, the centers of the long-focal length camera module 30 and the mid-focal length camera module 20 are becoming closer, such that the pictures that the long-focal length camera module 30 and the mid-focal length camera module 20 shoot simultaneously will become more and more consistent, which facilitates the post compositing of the images captured through various camera modules.

Particularly, according to the preferred embodiment, the situation of I2/R2≤0.125 is defined as "coinciding". Since the distance between the two centers with respect to the entire field of view area is equivalent to having a coinciding result, it is helpful for the post imaging process.

According to the preferred embodiment, at a positioned distanced from the end surface of the lens of the long-focal length camera module 30 no less than (≥) 20 cm, the center of the section of the field of view of the long-focal length camera module 30 and the center of the section of the field of view of the mid-focal length camera module 20 are coincided.

According to some embodiments of the present invention, I2 satisfies: 1 cm≤I2≤3 cm.

As for the mid-focal length camera module 20 and the wide-angle camera module 10, at the position distanced from an end surface of the lens of the mid-focal length camera module 20 for more than 3 cm, a field of view area of the field of view FOV2 of the mid-focal length camera module 20 is completely covered and included by a field of view area of the field of view FOV1 of the wide-angle camera module 10. Further, at position distanced from the end surface of the lens of the mid-focal length camera module 20 for no less than (≥) 10 cm, a distance between the mid-focal length camera module 20 and the wide-angle camera module 10 is I1, wherein a radius R1 of the field of view area of the field of view FOV1 of the wide-angle camera module 10 at that position satisfies the following condition: I1/R1≤0.125. It is worth mentioning that, for a position distanced from the end surface of the lens of the mid-focal length camera module 20 for no less than (≥) 10 cm, the center of the section of the field of view corresponding to the field of view FOV1 of the wide-angle camera module 10 and the center of the section of the field of view corresponding to the field of view FOV2 of the mid-focal length camera module 20 are becoming closer and closer, such that, as the shooting distance increases, the centers of the shot images of the mid-focal length camera module 20 and the wide-angle length camera module 10 can be more closer, so as to produce a better photographing performance with respect to the area of the section of the field of view corresponding to the center.

More specifically, as the distance from the end surface of the lens of the mid-focal length camera module 20 increases, the area of the section of the field of view area of the mid-focal length camera module 20 will also increase correspondingly because, with respect to the mid-focal length camera module 20, the field of view area of the mid-focal length camera module 20 is in conical shape, and that the farther from the tip of the conical shaped field of view area of the mid-focal length camera module 20, the section area of the conical shaped field of view area of the mid-focal length camera module 20 will be larger correspondingly. Correspondingly, the section of the field of view area of the wide-angle camera module 10 will also be larger and larger because, with respect to the wide-angle camera module 10, the area of the field of view of the wide-angle camera module 10 is also in conical shape, and that the farther from the tip of the conical shaped field of view area of the wide-angle camera module 10, the section area of the conical shaped field of view area of the wide-angle camera module 10 is larger correspondingly. Besides, the overlapping portion of the field of view areas of the mid-focal length camera module 20 and the wide-angle camera module 10 will be increasing in this manner as well. Nevertheless, with respect to the mid-focal length camera module 20 and the wide-angle camera module 10, the distance between the centers of the sections of the field of views of the mid-focal length camera module 20 and the wide-angle camera module 10 on the same plane stays unchanged because these centers are respectively positioned at the optical axes that are parallel to each other. However, in correspondence with the expanded sections of the field of views, the distance between their centers is being shortened. For example, when the radius R1 of the section of the field of view of the wide-angle camera module 10 is 10 cm, the section of the field of view of the mid-focal length camera module 20 will be covered and included by the section of the field of view of the wide-angle camera module 10. That is, the radius of the section of the field of view of the mid-focal length camera module 20 will be less than 10 cm. Then, when the distance I1 between the two centers is 1 cm, the ratio of the center distance I1 and the radius R1 of the wide-angle camera module 10 is 0.1. When the distance from the end surface of the lens of the mid-focal length camera module 20 has been increased and the radius R1 of the section of the field of view of the wide-angle camera module 10 is 20 cm at some position, the section of the field of view of the mid-focal length camera module 20 will be covered and included by the section of the field of view of the wide-angle camera module 10 and has a radius less than 20 cm. When the distance between the two centers is still 1cm, the ratio of the center distance I1 and the radius R1 of the wide-angle camera module 10 is 0.05. In other words, as the distance increases, with respect to the entire field of view area, the centers of the mid-focal length camera module 20 and the wide-angle camera module 10 are becoming closer and closer, such that the pictures that the mid-focal length camera module 20 and the wide-angle camera module 10 shoot simultaneously will become more and more consistent, which facilitates the post compositing of the images captured through various camera modules.

Particularly, according to the preferred embodiment, the situation of I1/R1≤0.125 is defined as "coinciding". Since the distance between the two centers with respect to the entire field of view area at this moment is equivalent to having a coinciding result, it is helpful for the post imaging process.

According to the preferred embodiment, at a position distanced from an end surface of a lens of the mid-focal length camera module 20 for no less than (≥) 10 cm, the center of the section of the field of view of the mid-focal length camera module 20 coincides with the center of the section of the field of view of the wide-angle camera module 10.

According to the preferred embodiment, the zooming ratio of the multi-aperture imaging system 1 is ≥4 (i.e. not less than 4). That is, the ratio of the equivalent focal lengths of the long-focal length camera module 30 and the wide-angle camera module 10 is no less than (≥) 4.

Preferably, according to one embodiment of the present invention, the ratio of the equivalent focal lengths of the mid-focal length camera module 20 and the wide-angle camera module 10 is 3, while the ratio of the equivalent focal lengths of the long-focal length camera module 30 and the wide-angle camera module 10 is 5. For the long-focal length camera module 30 as an example, the equivalent focal length is P1=F1*43.2/L, wherein F1 refers to the effective focal length of the long-focal length camera module 30, 43.27 mm refers to the length of the diagonal line of the 135 film, and L refers to the length of the diagonal line of the photosensitive area of the photosensitive element.

According to some embodiments, L refers to the length of the diagonal line of the photosensitive area of the CMOS photosensitive element. The effective focal length F1 refers to the focal length of a long-focal length lens of the long-focal length camera module 30, which is a fixed-parameter of the long-focal length lens. By the time the long-focal length lens has manufactured, the F1 is fixed. For a longer effective focal length F1 of the long-focal length lens, the length of the long-focal length lens has to be longer. The equivalent focal length P1 has to do with the overall focal length of the long-focal length lens and the photosensitive component, which is the focal length of the entire camera module.

When the photosensitive element of the long-focal length photosensitive component matching the same long-focal length lens is different, the equivalent focal length P1 will be different too. According to the present invention, a zooming ratio of the long-focal length camera module 30 and the wide-angle camera module 10, or the long-focal length camera module 30 and the mid-focal length camera module 20, or the mid-focal length camera module 20 and the wide-angle camera module 10 has to do with the contrast among the entire camera module, rather than the contrast of a lens of a camera module. In contrast to the effective focal length, the equivalent focal length has to consider the lens, the photosensitive component, and the factors regarding to the size of the photosensitive element. Hence, the ratio of the equivalent focal lengths is adopted here for representing the zooming ability of the multi-aperture imaging system 1.

Further, according to some embodiments of the present invention, the long-focal length camera module 30 is embodied as a periscope camera module, wherein the periscope camera module comprises a light turning unit adapted for turning light for 90 degrees for passing through an optical lens and being received by the photosensitive component for imaging. The photosensitive component, the optical lens, and the light turning unit are arranged along the width direction of the electronic device. The light reflected by the object and perpendicular to the width direction of the electronic device is turned by the light turning unit to pass through the optical lens along the width direction of the electronic device to be received by the photosensitive component for imaging. In this manner, it can effectively reduce the height of the long-focal length camera module 30, especially when the long-focal length camera module 30 has a larger focal length.

Further, the multi-aperture imaging system 1 comprises a flash 40. Preferably, the flash 40 is arranged at a center among the wide-angle camera module 10, the long-focal length camera module 30 and the mid-focal length camera module 20. The light emitted by the flash 40 is capable of satisfying the photographing needs of the wide-angle camera module 10, the long-focal length camera module 30 and the mid-focal length camera module 20, so as to assist the multi-aperture imaging system to achieve a better photographing performance.

Figure 3:
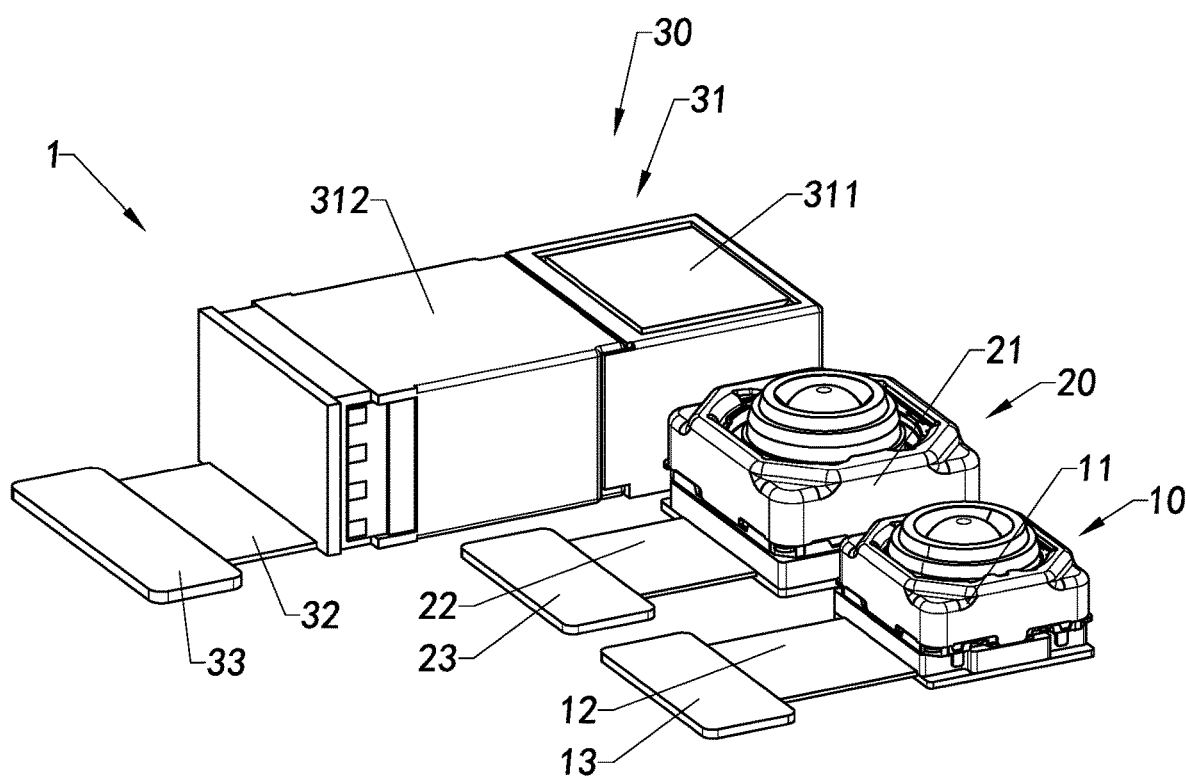
FIG. 3 is a perspective view of the multi-aperture imaging system according to the above preferred embodiment of the present invention.

Further, referring to FIG. 3, according to the preferred embodiment, the multi-aperture imaging system 1 comprises the long-focal length camera module 30, the mid-focal length camera module 20 and the wide-angle camera module 10, wherein each of the long-focal length camera module 30, the mid-focal length camera module 20 and the wide-angle camera module 10 has a field of view, which are FOV3, FOV2, and FOV1 respectively, wherein FOV1>FOV2>FOV3. Besides, the field of view FOV3 of the long-focal length camera module 30 is arranged closer to the field of view FOV2 of the mid-focal length camera module 20, and the field of view FOV2 of the mid-focal length camera module 20 is arranged closer to the field of view FOV1 of the wide-angle camera module 10.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to outside through the third connector 33. According to the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312.

The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at two ends of the long-focal length camera module 30.

The third connection element 32 is arranged and formed through extending outwardly from an end of the third photosensitive component 312 of the third camera body 31. According to the preferred embodiment, the third connection element 32 is arranged to extend outwardly along a length direction of the third camera body 31. The length direction of the third camera body 31 refers to the direction of the third lens unit 311 towards the third photosensitive component 312.

Further, the mid-focal length camera module 20 comprises a second camera body 21, a second connection element 22 and a second connector 23, wherein the second connector 23 and the second camera body 21 are connected and communicated through the second connection element 22. According to some embodiments of the present invention, the second connection element 22 can be a flexible circuit board. According to the preferred embodiment, the extending direction of the second connection element 22 to the second connector 23 of the mid-focal length camera module 20 is parallel with the extending direction of the third connection element 32 to the third connector 33 of the long-focal length camera module 30.

Further, the second camera body 21 is arranged adjacent to the third camera body 31, such that the field of view FOV3 of the third camera body 31 is mostly covered and included by the field of view FOV2 of the second camera body 21.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to the preferred embodiment, the extending direction of the first connection element 12 to the first connector 13 of the wide-angle camera module 10 is parallel to the extending direction of the third connection element 32 of the long-focal length camera module 30 to the periscope connector. The mid-focal length camera module 20 and the wide-angle camera module 10 are both arranged on the same side of the long-focal length camera module 30. Besides, the mid-focal length camera module 20 is arranged at the position closer to the light turning unit of the long-focal length camera module 30 than the wide-angle camera module 10, so as to allow most area of the field of view FOV3 of the third camera body 31 to be covered and included by the field of view FOV2 of the second camera body 21. Further, the field of view FOV2 of the second camera body 21 is mostly covered and included by the field of view FOV1 of the first camera body 11.

In other words, the length direction of the wide-angle camera module 10 is parallel to the length direction of the mid-focal length camera module 20 and the length direction of the wide-angle camera module 10 is also parallel to the length direction of the third camera body 31 of the long-focal length camera module 30. Alternatively, a light opening of the wide-angle camera module 10, a light opening of the mid-focal length camera module 20, and a light opening of the long-focal length camera module 30 are at the same axial line.

Figure 4A:
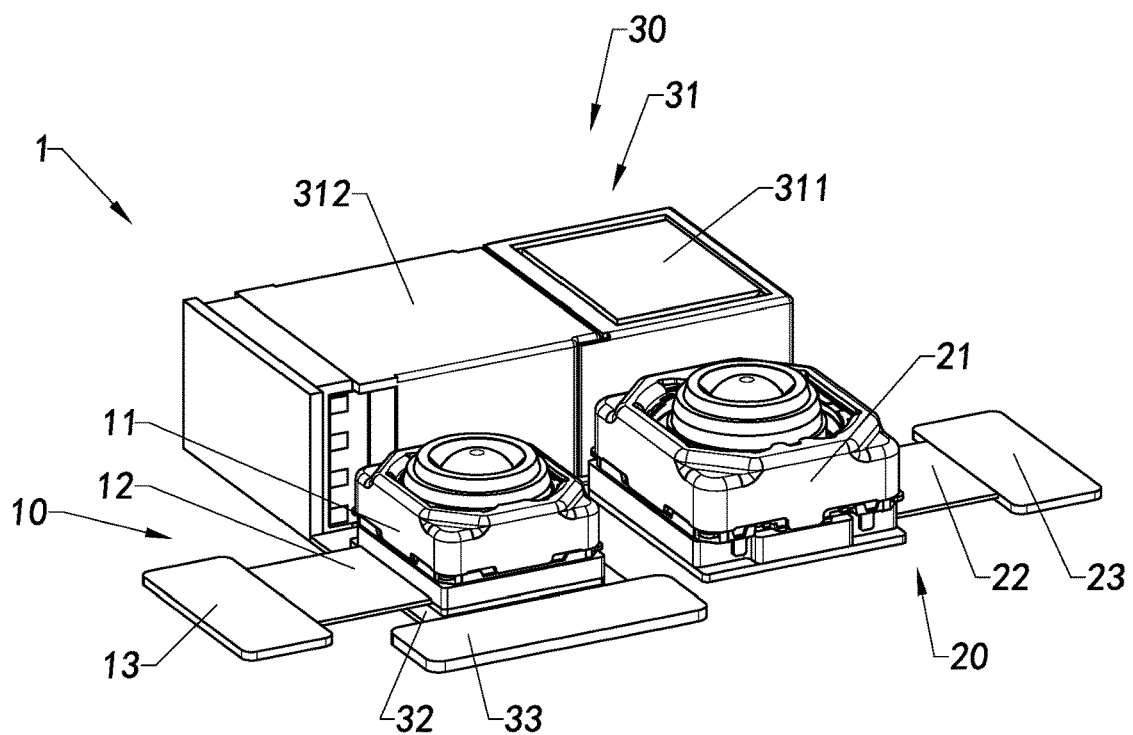
FIG. 4A is a perspective view of a first alternative mode of the multi-aperture imaging system according to the above preferred embodiment of the present invention.

FIG. 4A illustrates a first alternative mode of the multi-aperture imaging system according to the above preferred embodiment of the present invention.

Specifically speaking, the multi-aperture imaging system 1 comprises the long-focal length camera module 30, the mid-focal length camera module 20 and the wide-angle camera module 10, wherein each of the long-focal length camera module 30, the mid-focal length camera module 20 and the wide-angle camera module 10 has a field of view, which are FOV3, FOV2, and FOV1 respectively, wherein FOV1>FOV2>FOV3. Besides, the field of view FOV3 of the long-focal length camera module 30 is arranged closer to the field of view FOV2 of the mid-focal length camera module 20 and the field of view FOV2 of the mid-focal length camera module 20 is arranged closer to the field of view FOV1 of the wide-angle camera module 10.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to outside through the third connector 33. According to the first alternative mode of the preferred embodiment, the third camera body 31, the third connection element 32 and the third connector 33 are not all arranged at the same axial line. Rather, the third connection element 32 is arranged in the manner that it is outwardly extended from a side of the third camera body 31.

The third camera body 31 comprises a third lens unit 311 and a third photosensitive component 312, wherein the light passes through the third lens unit 311 to reach the third photosensitive component 312.

The long-focal length camera module 30 is also embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is electrically connected with the third lens unit 311 and the third photosensitive component 312, so as to transfer the information received by the third lens unit 311 and the third photosensitive component 312 to the third connector 33 through the third connection element 32 for output.

In this manner, the long-focal length camera module 30 does not have to separately, for example, be arranged on the light turning mechanism or require a corresponding circuit board arranged for supplying power for the driving components of the third lens unit 311. In this integral manner, the installation space of the long-focal length camera module 30 can be reduced.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

Alternatively, the third connector 33 can be arranged at an end of the photosensitive element or an end of the processing element, so as to reduce the line length connected to the photosensitive element or the processing element. Certainly, it may also be arranged at other positions of the third camera body 31.

According to the first alternative mode of the preferred embodiment, the third connection element 32 is arranged at an end of the photosensitive element so as to prevent exceeding length of the line for the photosensitive element and to enhance the electromagnetic immunity ability of the photosensitive element, which avoids inferior picture quality rendered by magnetic interfere.

The third connection element 32 is arranged and formed through extending outwardly from an end of the third photosensitive component 312 of the third camera body 31. According to the first alternative mode of the preferred embodiment, the third connection element 32 is arranged to extend outwardly along a direction perpendicular to the length direction of the third camera body 31. The length direction of the third camera body 31 refers to the direction of the third lens unit 311 towards the third photosensitive component 312.

According to another alternative mode of the preferred embodiment of the present invention, the third connection element 32 can be arranged at an end of the processing element, wherein the processing element is arranged at the light turning mechanism of the third lens unit 311.

Further, the mid-focal length camera module 20 comprises a second camera body 21, a second connection element 22 and a second connector 23, wherein the second connector 23 and the second camera body 21 are connected and communicated through the second connection element 22. According to some embodiments of the present invention, the second connection element 22 can be a flexible circuit board. In one embodiment, the length direction of the mid-focal length camera module 20 and the extending direction of the third camera body 31 are consistent. In addition, the second camera body 21 can be arranged adjacent to the third lens unit 311 of the third camera body 31. Or, the second camera body 21 can be arranged adjacent to a side of the third lens unit 311 of the third camera body 31. The second connection element 22 can be arranged and formed in the manner of outwardly extending from the second camera body 21. The second connection element 22 is, with respect to the third camera body 31, protruded from the third camera body 31. In one embodiment, the mid-focal length camera module 20 can be arranged adjacent to the third lens unit 311 of the long-focal length camera module 30, such that the field of view FOV2 of the mid-focal length camera module 20 is larger than the field of view FOV3 of the long-focal length camera module 30. In addition, when the field of view FOV2 of the mid-focal length camera module 20 nears the field of view FOV3 of the long-focal length camera module 30, most portion of the field of view FOV3 of the long-focal length camera module 30 will be covered and included by the field of view FOV2 of the mid-focal length camera module 20.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to one embodiment, the first camera body 11 of the wide-angle camera module 10 can be arranged on the third connection element 32 of the long-focal length camera module 30.

Specifically speaking, the long-focal length camera module 30 has a relatively large height with respect to the wide-angle camera module 10, so that the wide-angle camera module 10 can be mounted on the third connection element 32 of the long-focal length camera module 30, which reduces the area occupied by the two elements without increasing the height of the multi-aperture imaging system 1. Preferably, the third connection element 32 has a front side and a back side. The third connection element 32 is arranged and formed in the manner of extending outwardly from an end of the circuit board of the third photosensitive component of the long-focal length camera module 30. The front side of the third connection element 32 refers to the side that faces outward when the long-focal length camera module 30 is mounted on the electronic device, while the back side refers to the side that faces the electronic device when the long-focal length camera module 30 is mounted on the electronic device.

The first camera body 11 of the wide-angle camera module 10 can be at least partially overlapped with the flat and smooth front side of the third connection element 32.

Further, the field of view FOV3 of the long-focal length camera module 30 is smaller than the field of view FOV1 of the wide-angle camera module 10. The field of view FOV1 of the wide-angle camera module 10 is larger than the field of view FOV2 of the mid-focal length camera module 20 and most of the field of view area of the field of view FOV2 is covered and included by the scope of the field of view FOV1. In this way, the multi-aperture imaging system 1 can have a larger zoom ratio and a shorter height as well as be capable of transiting from a larger focal length to a smaller focal length naturally.

The length direction of the wide-angle camera module 10 refers to the direction of the axial line that the first camera body 11, the first connection element 12, and the first connector 13 are at, while the length direction of the mid-focal length camera module 20 refers to the direction of the axial line that the second camera body 21, the second connection element 22, and the second connector 23 are at. The length direction of the third camera body 31 of the long-focal length camera module 30 refers to the extending direction of the third lens unit 311 toward the third photosensitive component 312. Accordingly, the length direction of the mid-focal length camera module 20 is parallel to the length direction of the third camera body 31 of the long-focal length camera module 30, while the length direction of the wide-angle camera module 10 is parallel to the length direction of the mid-focal length camera module 20.

The wide-angle camera module 10 and the mid-focal length camera module 20 are relatively arranged on the same side of the long-focal length camera module 30 with respect to the long-focal length camera module 30. More specifically, the first camera body 11 of the wide-angle camera module 10 and the second camera body 21 of the mid-focal length camera module 20 are arranged in a face-to-face manner, the first connector 13 of the wide-angle camera module 10 and the second connector 23 of the mid-focal length camera module 20 are arranged in a back-to-back manner, and both the first connector 13 and the second connector 23 are protruded from the third camera body 31.

Further, the length direction of the wide-angle camera module 10, the length direction of the mid-focal length camera module 20, and the length direction of the third camera body 31 of the long-focal length camera module 30 are parallel to one another.

Figure 4B:
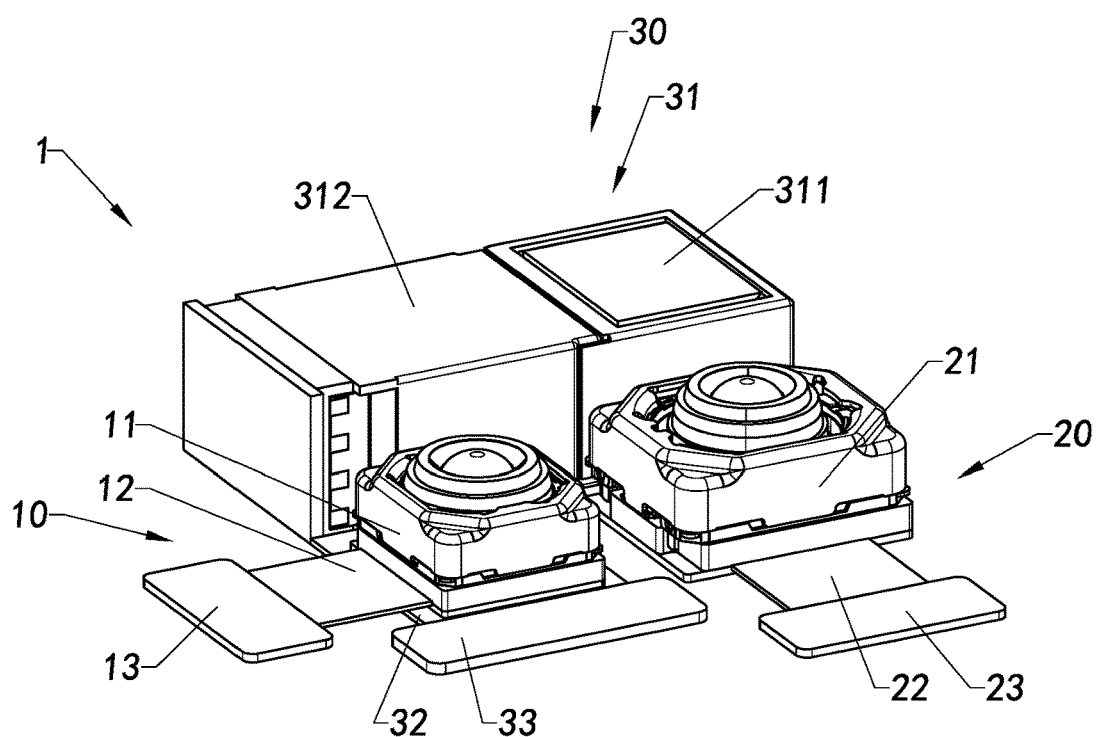
FIG. 4B is a perspective view of a second alternative mode of the multi-aperture imaging system according to the above preferred embodiment of the present invention.

FIG. 4B illustrates a second alternative mode of the multi-aperture imaging system 1 according to the above preferred embodiment of the present invention.

Specifically speaking, the multi-aperture imaging system 1 comprises the long-focal length camera module 30, the mid-focal length camera module 20 and the wide-angle camera module 10, wherein each of the long-focal length camera module 30, the mid-focal length camera module 20 and the wide-angle camera module 10 has a field of view, which are FOV3, FOV2, and FOV1 respectively, wherein FOV1>FOV2>FOV3. Besides, the field of view FOV3 of the long-focal length camera module 30 is arranged closer to the field of view FOV2 of the mid-focal length camera module 20 and the field of view FOV2 of the mid-focal length camera module 20 is arranged closer to the field of view FOV1 of the wide-angle camera module 10.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to the outside through the third connector 33. According to the second alternative mode of the preferred embodiment, the third camera body 31, the third connection element 32 and the third connector 33 are not all arranged at the same axial line. Rather, the third connection element 32 is arranged in the manner that it is outwardly extended from a side of the third camera body 31.

The third camera body 31 comprises a third lens unit 311 and a third photosensitive component 312, wherein the light passes through the third lens unit 311 to reach the third photosensitive component 312.

The long-focal length camera module 30 is embodied as a periscope camera module. The third lens unit 311 further comprises a light turning mechanism, a lens component and a processing element, wherein the light reach the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

The third connection element 32 is arranged and formed through extending outwardly from an end of the third photosensitive component 312 of the third camera body 31. According to the second alternative mode of the preferred embodiment, the third connection element 32 is arranged to extend outwardly along a direction perpendicular to the length direction of the third camera body 31. The length direction of the third camera body 31 refers to the direction of the third lens unit 311 towards the third photosensitive component 312.

Further, the mid-focal length camera module 20 comprises a second camera body 21, a second connection element 22 and a second connector 23, wherein the second connector 23 and the second camera body 21 are connected and communicated through the second connection element 22. According to some other embodiments, the second connection element 22 can be a flexible circuit board. According to the second alternative mode of the preferred embodiment, the extending direction of the second connection element 22 to the second connector 23 of the mid-focal length camera module 20 is consistent with the extending direction of the third connection element 32 to the third connector 33 of the long-focal length camera module 30. In other words, the second connector 23 and the third connector 33 are arranged in the same side of the multi-aperture imaging system 1.

The second camera body 21 is arranged adjacent to the third camera body 31, such that the field of view FOV3 of the third camera body 31 is mostly covered and included by the field of view FOV2 of the second camera body 21.

The wide-angle camera module 10 comprises a first camera body 11, a first connection element 12 and a first connector 13, wherein the first connector 13 and the first camera body 11 are connected and communicated through the first connection element 12. According to other embodiments of the present invention, the first connection element 12 can be a flexible circuit board.

According to the second alternative mode of the preferred embodiment, the first camera body 11 of the wide-angle camera module 10 is at least partially overlapped with the third connection element 32 of the long-focal length camera module 30 so as to reduce the height difference between the wide-angle camera module 10 and the long-focal length camera module and save the installation space for the two camera modules. In addition, the wide-angle camera module 10 and the mid-focal length camera module 20 are arranged on the same side of the long-focal length camera module 30 with respect to the long-focal length camera module 30. The length direction of the mid-focal length camera module 20 is perpendicular to the length direction of the third camera body 31 of the long-focal length camera module 30 and the length direction of the mid-focal length camera module 20 is perpendicular to the length direction of the wide-angle camera module 10.

According to the second alternative mode of the preferred embodiment, the third connection element 32 is arranged to have a certain width and length, such that the first camera body 11 of the wide-angle camera module 10 is at least partially overlapped with the third connection element 32 of the long-focal length camera module 30 in order to reduce the height difference between the wide-angle camera module 10 and the long-focal length camera module and save the installation space for the two camera modules. The extending direction of the first connection element 12 to the first connector 13 is perpendicular to the extending direction of the third connection element 32 to the third connector 33. Besides, the first connector 13 is arranged on the first connection element 12 in an outward manner with respect to the third connection element 32. Both the wide-angle camera module 10 and the mid-focal length camera module 20 are positioned at the same side of the long-focal length camera module 30.

Figure 5A:
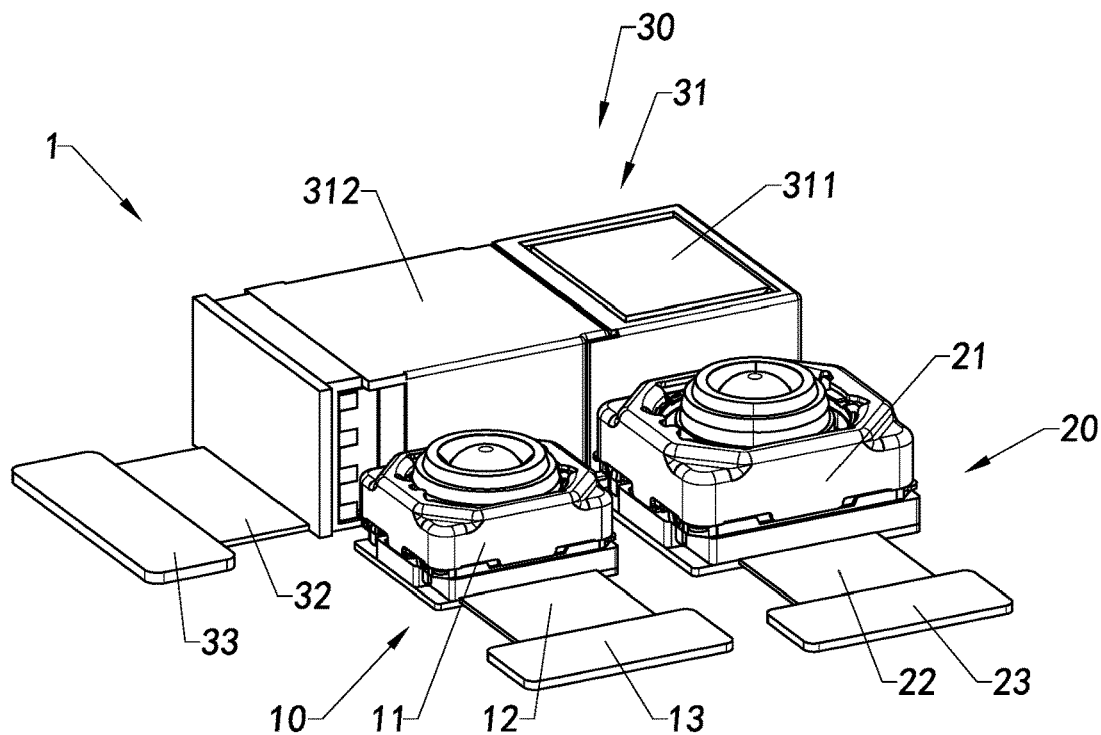
FIG. 5A is a perspective view of a third alternative mode of the multi-aperture imaging system according to the above preferred embodiment of the present invention.

FIG. 5A illustrates a third alternative mode of the multi-aperture imaging system 1 according to the above preferred embodiment of the present invention.

Specifically speaking, the multi-aperture imaging system 1 comprises the long-focal length camera module 30, the mid-focal length camera module 20 and the wide-angle camera module 10, wherein each of the long-focal length camera module 30, the mid-focal length camera module 20 and the wide-angle camera module 10 has a field of view, which are FOV3, FOV2, and FOV1 respectively, wherein FOV1>FOV2>FOV3. Besides, the field of view FOV3 of the long-focal length camera module 30 is arranged closer to the field of view FOV2 of the mid-focal length camera module 20 and the field of view FOV2 of the mid-focal length camera module 20 is arranged closer to the field of view FOV1 of the wide-angle camera module 10.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to the outside through the third connector 33. According to the third alternative mode of the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312, The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is respectively electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

The third connection element 32 is arranged and formed through extending outwardly from an end of the third photosensitive component 312 of the third camera body 31. According to the third alternative mode of the preferred embodiment, the third connection element 32 is arranged to extend outwardly along the length direction of the third camera body 31. The length direction of the third camera body 31 refers to the direction of the third lens unit 311 towards the third photosensitive component 312.

Further, the mid-focal length camera module 20 comprises a second camera body 21, a second connection element 22 and a second connector 23, wherein the second connector 23 and the second camera body 21 are connected and communicated through the second connection element 22. According to some other embodiments of the present invention, the second connection element 22 can be a flexible circuit board. According to the third alternative mode of the preferred embodiment, the extending direction of the second connection element 22 to the second connector 23 of the mid-focal length camera module 20 is perpendicular to the extending direction of the third connection element 32 to the third connector 33 of the long-focal length camera module 30.

Further, the second camera body 21 is arranged adjacent to the third camera body 31, such that the field of view FOV3 of the third camera body 31 is mostly covered and included by the field of view FOV2 of the second camera body 21.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to the third alternative mode of the preferred embodiment, the extending direction of the first connection element 12 to the first connector 13 of the wide-angle camera module 10 is perpendicular to the extending direction of the third connection element 32 of the long-focal length camera module 30 to the periscope connector. The mid-focal length camera module 20 and the wide-angle camera module 10 are both arranged at the same side of the long-focal length camera module 30. Besides, the mid-focal length camera module 20 is arranged at the position closer to the light turning unit of the long-focal length camera module 30 than the wide-angle camera module 10, so as to allow most area of the field of view FOV3 of the third camera body 31 to be covered and included by the field of view FOV2 of the second camera body 21. Further, the field of view FOV2 of the second camera body 21 is mostly covered and included by the field of view FOV1 of the first camera body 11.

In other words, the length direction of the wide-angle camera module 10 is parallel to the length direction of the mid-focal length camera module 20, while the length direction of the wide-angle camera module 10 is perpendicular to the length direction of the third camera body 31 of the long-focal length camera module 30.

Figure 5B:
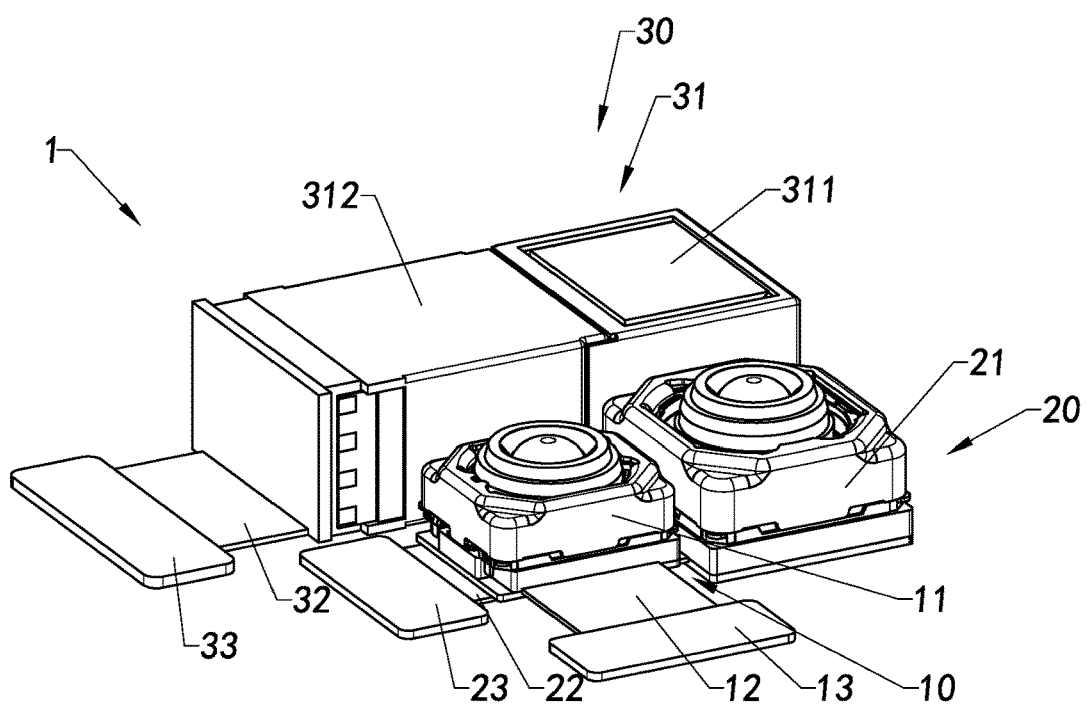
FIG. 5B is a perspective view of a fourth alternative mode of the multi-aperture imaging system according to the above preferred embodiment of the present invention.

FIG. 5B illustrates a fourth alternative mode of the multi-aperture imaging system 1 according to the above preferred embodiment of the present invention.

Specifically speaking, the multi-aperture imaging system 1 comprises the long-focal length camera module 30, the mid-focal length camera module 20 and the wide-angle camera module 10, wherein each of the long-focal length camera module 30, the mid-focal length camera module 20 and the wide-angle camera module 10 has a field of view, which are FOV3, FOV2, and FOV1 respectively, wherein FOV1>FOV2>FOV3. Besides, the field of view FOV3 of the long-focal length camera module 30 is arranged closer to the field of view FOV2 of the mid-focal length camera module 20 and the field of view FOV2 of the mid-focal length camera module 20 is arranged closer to the field of view FOV1 of the wide-angle camera module 10.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to the outside through the third connector 33. According to the fourth alternative mode of the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312.

The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is respectively electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

The third connection element 32 is arranged and formed through extending outwardly from an end of the third photosensitive component 312 of the third camera body 31. According to the fourth alternative mode of the preferred embodiment, the third connection element 32 is arranged to extend outwardly along the length direction of the third camera body 31. The length direction of the third camera body 31 refers to the direction of the third lens unit 311 toward the third photosensitive component 312.

The third connection element 32 is arranged and formed through being extended outwardly from a side of the third photosensitive component 312 along the length direction of the third camera body 31. The length direction of the third camera body 31 refers to the extending direction of the periscope lens unit from the periscope photosensitive component.

Further, the mid-focal length camera module 20 comprises a second camera body 21, a second connection element 22 and a second connector 23, wherein the second connector 23 and the second camera body 21 are connected and communicated through the second connection element 22. According to some embodiments of the present invention, the second connection element 22 can be a flexible circuit board. According to the fourth alternative mode of the preferred embodiment, the extending direction of the second connection element 22 to the second connector 23 of the mid-focal length camera module 20 is consistent with the extending direction of the third connection element 32 to the third connector 33 of the long-focal length camera module 30. Besides, the second connection element 22 is arranged to have a certain length and width.

Further, the second camera body 21 is arranged adjacent to the third camera body 31, such that the field of view FOV3 of the third camera body 31 is mostly covered and included by the field of view FOV2 of the second camera body 21.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to the fourth alternative mode of the preferred embodiment, the first camera body 11 of the wide-angle camera module 10 is at least partially overlapped with the second connection element 22 of the mid-focal length camera module 20. Because, generally, the height of the wide-angle camera module 10 is lower than the height of the mid-focal length camera module 20, the first camera body 11 of the wide-angle camera module 10 is mounted on the second connection element 22 of the mid-focal length camera module 20, so as to fully use the height difference between the first camera body 11 and the second camera body 21 to reduce the mounting height of the wide-angle camera module 10 and the mid-focal length camera module 20.

The extending direction of the second connection element 22 to the second connector 23 is perpendicular to the extending direction of the first connection element 12 to the first connector 13. Besides, the first connector 13 is positioned at the outer side relatively with the first camera body 11.

In other words, the length direction of the mid-focal length camera module 20 is parallel to the length direction of the long-focal length camera module 30, while the length direction of the mid-focal length camera module 20 is perpendicular to the length direction of the wide-angle camera module 10.

It is worth mentioning that, according to some embodiments of the present invention, the long-focal length camera module 30, the mid-focal length camera module 20 and the wide-angle camera module 10 can share at least one connector, so as to save the installation space of the camera modules. For example, the long-focal length camera module 30 and the mid-focal length camera module 20 can share a connector, which indicates that the third connector 33 and the second connector 23 are the same connector in this case. For another example, the long-focal length camera module 30 and the wide-angle camera module 10 can share a connector, which indicates that the third connector 33 and the first connector 13 are the same connector in this case. For another example, the mid-focal length camera module 20 and the wide-angle camera module 10 can share the same connector, which means that the second connector 23 and the first connector 13 are the same connector. For another example, the long-focal length camera module 30, the mid-focal length camera module 20, and the wide-angle camera module 10 can share the same connector, which indicates that the first connector 13, the second connector 23, and the third connector 33 are the same connector in this case.

Figure 6A:
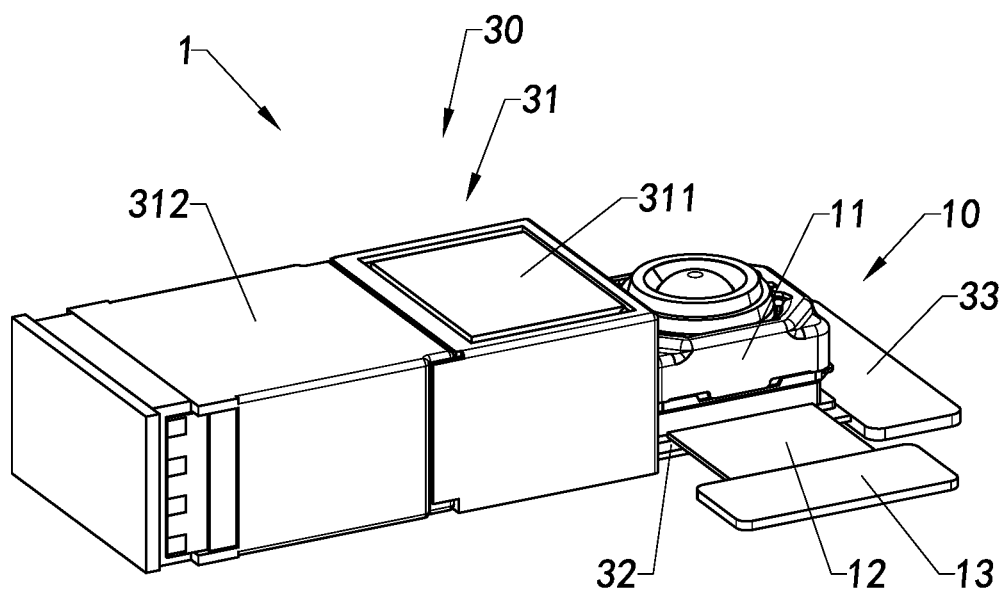
FIG. 6A is a perspective view of a fifth alternative mode of the multi-aperture imaging system according to the above preferred embodiment of the present invention.

FIG. 6A illustrates a fifth alternative mode of the multi-aperture imaging system 1 according to the above preferred embodiment of the present invention.

According to the fifth alternative mode of the preferred embodiment, the multi-aperture imaging system comprises a long-focal length camera module 30 and a wide-angle camera module 10, wherein the field of view FOV3 of the long-focal length camera module 30 and the field of view FOV1 of the wide-angle camera module 10 satisfy the following conditions: FOV1>FOV3 and the ratio of the equivalent focal lengths of the long-focal length camera module 30 and the wide-angle camera module 10 is ≥4 (i.e. not less than 4). According to some other embodiments of the present invention, the ratio of the equivalent focal lengths of the long-focal length camera module 30 and the wide-angle camera module 10 can be no less than (≥) 5.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to the outside through the third connector 33. According to the fifth alternative mode of the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312, The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is respectively electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

The third connection element 32 is arranged and formed through extending outwardly from an end of the third lens unit 311 of the third camera body 31. According to the fifth alternative mode of the preferred embodiment, the third connection element 32 is arranged to extend outwardly along the length direction of the third camera body 31. The length direction of the third camera body 31 refers to the direction of the third lens unit 311 towards the third photosensitive component 312.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to the fifth alternative mode of the preferred embodiment, the first camera body 11 of the wide-angle camera module 10 is mounted on the third connection element 32 of the long-focal length camera module 30. Because, generally, the height of the wide-angle camera module 10 is lower than the height of the long-focal length camera module 30, the first camera body 11 of the wide-angle camera module 10 is mounted on the third connection element 32 of the periscope camera module, so as to fully use the height difference between the first camera body 11 and the periscope camera body to reduce the mounting height of the wide-angle camera module 10 and the long-focal length camera module 30.

The extending direction of the third connection element 32 to the third connector 33 is perpendicular to the extending direction of the first connection element 12 to the first connector 13. Besides, the first connector 13 is, positioned at the outer side relatively with the first camera body 11. In other words, the length direction of the third camera body 31 of the long-focal length camera module 30 is perpendicular to the length direction of the wide-angle camera module 10.

Figure 6B:
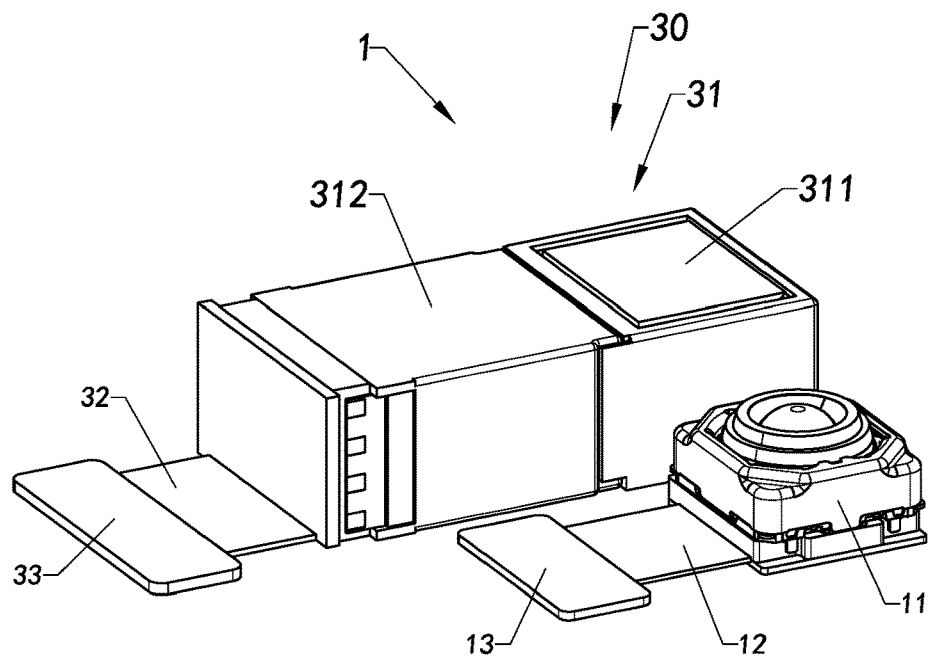
FIG. 6B is a perspective view of a sixth alternative mode of the multi-aperture imaging system according to the above preferred embodiment of the present invention.

FIG. 6B illustrates a sixth alternative mode of the multi-aperture imaging system 1 according to the above preferred embodiment of the present invention.

According to the sixth alternative mode of the preferred embodiment, the multi-aperture imaging system 1 comprises a long-focal length camera module 30 and a wide-angle camera module 10, wherein the field of view FOV3 of the long-focal length camera module 30 and the field of view FOV1 of the wide-angle camera module 10 satisfy the following conditions: FOV1>FOV3 and the ratio of the equivalent focal lengths of the long-focal length camera module 30 and the wide-angle camera module 10 is ≥4 (i.e. not less than 4). According to some embodiments of the present invention, the ratio of the equivalent focal lengths of the long-focal length camera module 30 and the wide-angle camera module 10 can be no less than (≥) 5.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to outside through the third connector 33. According to the sixth alternative mode of the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312, The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is respectively electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30.

The third connection element 32 is arranged and formed through extending outwardly from an end of the third photosensitive component 312 of the third camera body 31.

The third connection element 32 is arranged and formed through being extended outwardly from a side of the third photosensitive component 312 along the length direction of the third camera body 31. The length direction of the periscope camera module refers to the extending direction of the third lens unit 311 from the third photosensitive component 312.

The wide-angle camera module 10 comprises a first camera body 11, a first connection element 12 and a first connector 13, wherein the first connector 13 and the first camera body 11 are connected and communicated through the first connection element 12. According to some embodiments of the present invention, the first connection element 12 can be a flexible circuit board.

According to the sixth alternative mode of the preferred embodiment, the wide-angle camera module 10 is parallelly arranged adjacent to the third lens unit 311 of the long-focal length camera module 30.

The extending direction of the third connection element 32 to the third connector 33 is parallel to the extending direction of the first connection element 12 to the first connector 13. Besides, the first connector 13 is positioned at the outer side relatively with the first camera body 11.

In other words, the length direction of the third camera body 31 of the long-focal length camera module 30 is parallel to the length direction of the wide-angle camera module 10.

Figure 6C:
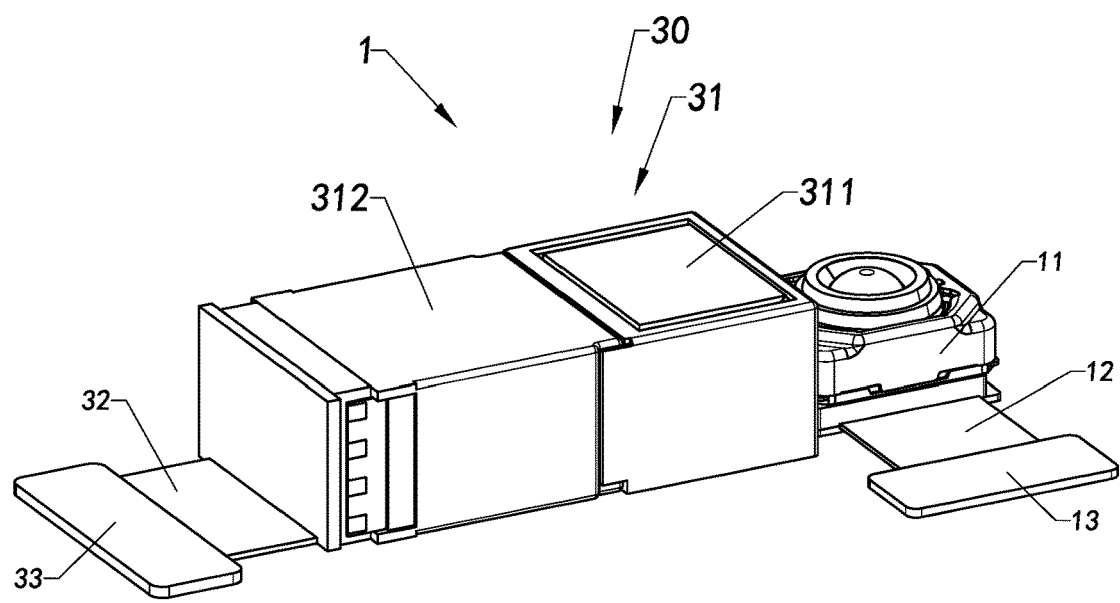
FIG. 6C is a perspective view of a seventh alternative mode of the multi-aperture imaging system according to the above preferred embodiment of the present invention.

FIG. 6C illustrates a seventh alternative mode of the multi-aperture imaging system 1 according to the above preferred embodiment of the present invention.

According to the seventh alternative mode of the preferred embodiment, the multi-aperture imaging system 1 comprises a long-focal length camera module 30 and a wide-angle camera module 10, wherein the field of view FOV3 of the long-focal length camera module 30 and the field of view FOV1 of the wide-angle camera module 10 satisfy the following conditions: FOV1>FOV3 and the ratio of the equivalent focal lengths of the long-focal length camera module 30 and the wide-angle camera module 10 is ≥4 (i.e. not less than 4). According to some embodiments of the present invention, the ratio of the equivalent focal lengths of the long-focal length camera module 30 and the wide-angle camera module 10 is no less than (≥) 5.

The long-focal length camera module 30 comprises a third camera body 31, a third connection element 32 and a third connector 33, wherein the third connection element 32 is electrically connected with the third camera body 31 and the third connector 33. The third connector 33 is adapted for connecting and communicating the third camera body 31 with the electronic device. The circuit elements and so forth of the third camera body 31 are integrally connected with the third connection element 32 and connected to the outside through the third connector 33. According to the seventh alternative mode of the preferred embodiment, the third camera body 31, the third connection element 32 and the third connector 33 are arranged at the same axial line.

The third camera body 31 comprises a third lens unit 311 and a third photosensitive component 312, wherein the light passes through the third lens unit 311 to reach the third photosensitive component 312, The long-focal length camera module 30 is embodied as a periscope camera module. The third lens unit 311 further comprises a light turning mechanism, a lens component and a processing element, wherein the light reached the light turning mechanism will be turned to enter a light path of the lens component to be received by the third photosensitive component 312 so as to allow the image information to be captured.

The processing element is capable of controlling not only the driving components, such as motor and etc., arranged in the third lens unit 311 so as to move the lens component for focusing, but also the motor movement of the light turning mechanism so as to adjust the position(s) and/or angle(s) of the reflector/lens/prism of the light turning mechanism. The third connection element 32 is respectively electrically connected with the third lens unit 311 and the third photosensitive component 312, so as to transfer the information received by the third lens unit 311 and the third photosensitive component 312 to the third connector 33 through the third connection element 32 for output.

The third photosensitive component 312 comprises a photosensitive element and a circuit board, wherein the photosensitive element is electrically connected with the circuit board. The photosensitive element and the processing element are respectively positioned at the two ends of the long-focal length camera module 30. The wide-angle camera module 10 comprises a first camera body 11, a first connection element 12 and a first connector 13, wherein the first connector 13 and the first camera body 11 are connected and communicated through the first connection element 12.

According to some embodiments of the present invention, the first connection element 12 can be a flexible circuit board.

The third connection element 32 is arranged and formed through extending from an end of the third photosensitive component 312 of the third camera body 31 along the length direction of the periscope camera module.

According to the seventh alternative mode of the preferred embodiment, the mid-focal length camera module 20 is arranged adjacent to an end of the third lens unit 311 of the third camera body 31 of the long-focal length camera module 30. The second camera body 11 of the mid-focal length camera module 20 is aligned to the long-focal length camera module 30.

The extending direction of the third connection element 32 to the third connector 33 is perpendicular to the extending direction of the first connection element 12 to the first connector 13. Besides, the first connector 13 is positioned at the outer side relatively with the first camera body 11.

Further, the length direction of the third camera body 31 of the long-focal length camera module 30 is perpendicular to the length direction of the wide-angle camera module 10.

Figure 7:
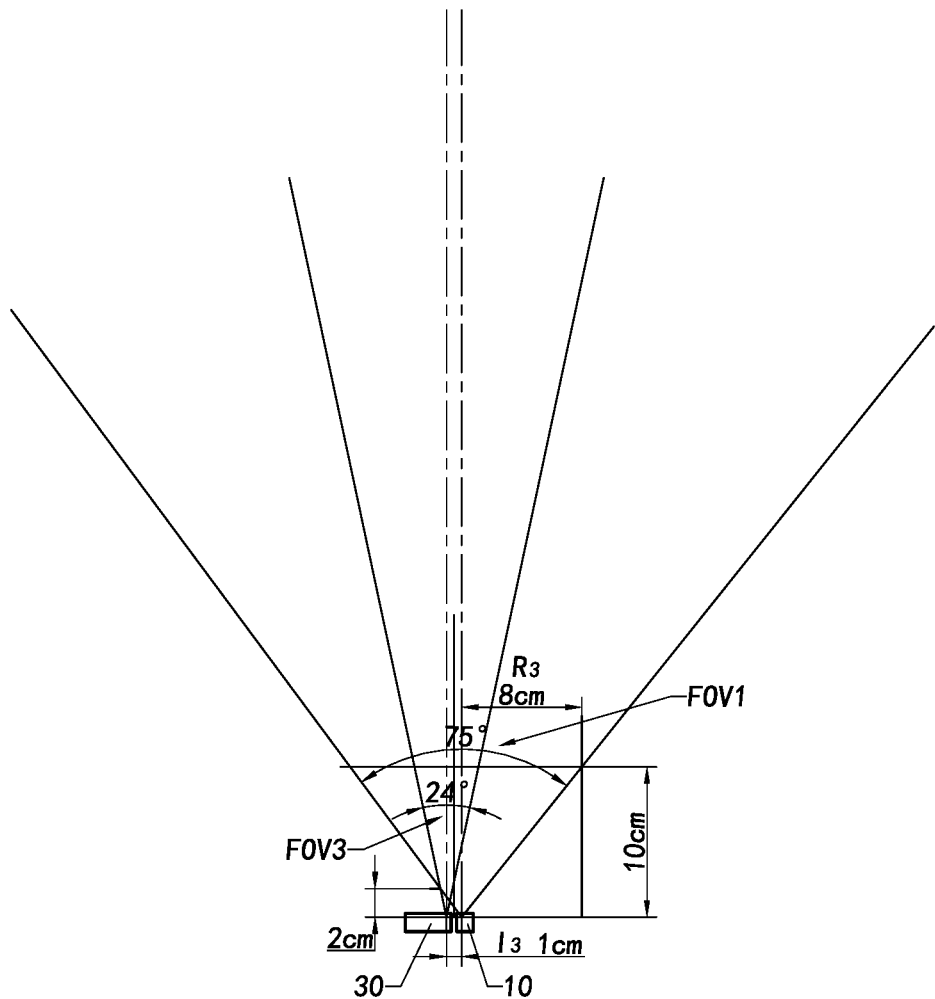
FIG. 7 is a schematic view of the multi-aperture imaging system according to the above preferred embodiment of the present invention.

It is worth mentioning that, according to one embodiment of the present invention, referring to FIG. 7, a field of view area of the field of view FOV3 of the long-focal length camera module 30 is completely covered and included by a field of view area of the field of view FOV1 of the wide-angle camera module 10 at a position no less than (≥) 2 cm from the end surface of the lens of the long-focal length camera module 30. Further, at a position distanced from the end surface of the lens of the long-focal length camera module 30 is ≥10 cm (i.e. not less than 10 cm), a distance between the long-focal length camera module 30 and the wide-angle camera module 10 is 13 and a radius R3 of the field of view area of the field of view FOV1 of the wide-angle camera module 10 at that position satisfies the following condition: I3/R3≤0.125. It is worth mentioning that, at a position distanced from the end surface of the lens of the long-focal length camera module 30 is no less than 10 cm, the center of the section of the field of view corresponding to the field of view FOV1 of the wide-angle camera module 10 and the center of the section of the field of view corresponding to the field of view FOV3 of the long-focal length camera module 30 are becoming closer and closer, with respect to the area of the section of the field of view corresponding to the center.

More specifically, as the distance from the end surface of the lens of the long-focal length camera module 30 increases, the area of the section of the field of view area of the long-focal length camera module 30 will also increase correspondingly because, with respect to the long-focal length camera module 30, the field of view area of the long-focal length camera module 30 is in conical shape, and that the farther from the tip of the conical shaped field of view area of the long-focal length camera module 30, the section area corresponding to the conical shaped field of view area of the long-focal length camera module 30 will be larger too. Correspondingly, the section of the field of view area of the wide-angle camera module 10 will also be larger and larger because, with respect to the wide-angle camera module 10, the field of view area of the wide-angle camera module 10 is also in conical shape, and that the farther from the tip of the conical shaped field of view area of the wide-angle camera module 10, the section area corresponding to the conical shaped field of view area of the wide-angle camera module 10 will be larger too. Besides, the overlap portion of the field of view areas of the long-focal length camera module 30 and the wide-angle camera module 10 will be increasing in this manner as well. Nevertheless, the distance between the centers of the sections of the field of views of the long-focal length camera module 30 and the wide-angle camera module 10 on the same plane stays unchanged because these centers are respectively positioned at the optical axes that are parallel to each other. However, the distance between these centers is shortened with respect to the expanded section of the field of view. For example, when the radius R3 of the section of the field of view of the long-focal length camera module 30 is 10 cm, the section of the field of view of the wide-angle camera module 10 will be covered and included by the section of the field of view of the long-focal length camera module 30. That is, the radius of the section of the field of view of the wide-angle camera module 10 will be less than 10 cm. Then, when the distance I3 between the two centers is 1 cm, the ratio of the center distance I3 and the radius R3 of the long-focal length camera module 30 is 0.1. When the distance from the end surface of the lens of the long-focal length camera module 30 has been increased and the radius R3 of the section of the field of view of the long-focal length camera module 30 is 20 cm at some position, the section of the field of view of the wide-angle camera module 10 will be covered and included by the section of the field of view of the long-focal length camera module 30 and has a radius less than 20 cm. When the distance between the two centers is still 1 cm, the ratio of the center distance I3 and the radius R3 of the long-focal length camera module 30 is 0.05. In other words, as the distance increases, with respect to the entire field of view area, the centers of the long-focal length camera module 30 and the wide-angle camera module 10 are becoming closer and closer, such that the pictures that the long-focal length camera module 30 and the wide-angle camera module 10 shoot simultaneously will become more and more consistent, which facilitates the post compositing of the images captured through various camera modules.

Particularly, according to the preferred embodiment, the situation of I3/R3≤0.125 is defined as "coinciding". Therefore, the distance between the two centers with respect to the entire field of view area is equivalent to a coinciding result, which is helpful for the post imaging process.

According to the preferred embodiment, at a position distanced from the end surface of the lens of the long-focal length camera module 30 is no less than (≥) 10 cm, the center of the section of the field of view of the long-focal length camera module 30 is coincided with the center of the section of the field of view of the wide-angle camera module 10.

As mentioned above, according to the preferred embodiment of the present invention, the long-focal length camera module 30 is a periscope camera module.

Figure 1B:
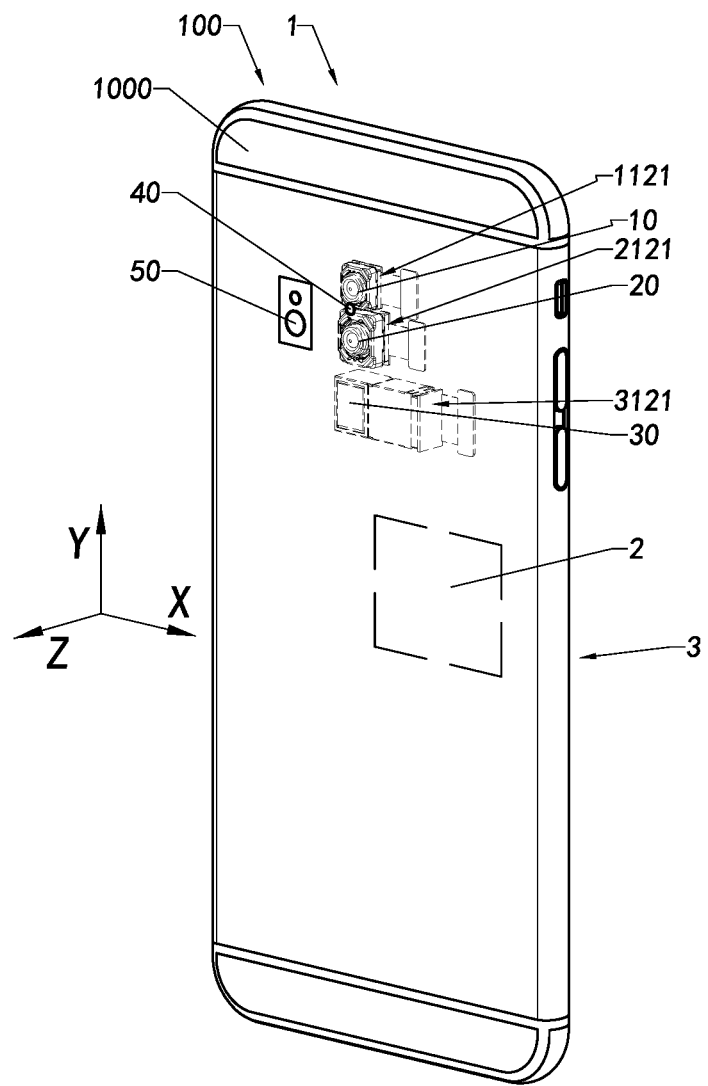
FIG. 1B is a perspective view of the electronic device having the multi-aperture imaging system according to the above preferred embodiment of the present invention.

Referring to FIGS. 1A and 1B, the mobile electronic device 100 comprises the electronic device body 1000 and the multi-aperture imaging system 1, wherein the multi-aperture imaging system 1 is mounted in the electronic device body 1000.

The electronic device body 1000 has a front side and a back side. During the operation of the mobile electronic device 100, the front side of the electronic device body 1000 is facing the user and the back side of the electronic device body 1000 is opposite to the user. The multi-aperture imaging system 1 can be mounted to function on the back side of the electronic device body 1000. That is to say, the user may utilize the multi-aperture imaging system 1 to photograph objects in the front of the mobile electronic device 100.

The multi-aperture imaging system 1 comprises the long-focal length camera module 30, the mid-focal length camera module 20 and the wide-angle camera module 10, wherein the long-focal length camera module 30, the mid-focal length camera module 20 and the wide-angle camera module 10 are arranged according to the length direction of the mobile electronic device 100. A light opening of the long-focal length camera module 30, a light opening of the mid-focal length camera module 20 and a light opening of the wide-angle camera module 10 are at the same axial line. The axial line is parallel to the length direction of the mobile electronic device 100. According to the preferred embodiment, the long-focal length camera module 30 is embodied as a periscope camera module.

The length direction of a photosensitive element 1121 of the wide-angle camera module 10, the length direction of a photosensitive element 2121 of the mid-focal length camera module 20, and the length direction of a photosensitive element 3121 of the long-focal length camera module 30 are parallel to the length direction of the electronic device body 1000, such that the length directions of the shot images of the camera modules are parallel to the length direction of the electronic device body 1000, which provides a better shooting experience and photographing performance.

Further, the length direction of the photosensitive element 3121 of the long-focal length camera module 30 is parallel to the length direction of the mobile electronic device 100. The plane where the photosensitive element 3121 is provided is perpendicular to the plane where the electronic device body 1000 is provided. The long-focal length camera module 30 is laterally mounted in the electronic device body 1000, such that the length direction of the shot image of the long-focal length camera module 30 is parallel to the length direction of the electronic device body 1000, which provides a better shooting experience and photographing performance.

According to the preferred embodiment, the length direction of the photosensitive element 1121 of the wide-angle camera module 10, the length direction of the photosensitive element 2121 of the mid-focal length camera module 20, and the length direction of the photosensitive element 3121 of the long-focal length camera module 30 are parallel to a Y-axis. For the photosensitive element 1121 as an example, the length direction of the photosensitive element 1121 refers to the extending direction from a high end of the photosensitive element 1121 towards a low end of the photosensitive element 1121. The high end of the photosensitive element 1121 refers to that one end of the two ends of the height direction of the photosensitive element 1121 that is at the higher position when the electronic device body 1000 is in a normal operation state. In other words, using the photosensitive element 3121 as an example, the length direction of the photosensitive element 3121 refers to the extending direction from an end of a high end of the photosensitive element 3121 near the electronic device body 1000 towards an end of the high end away from the electronic device body 1000. The high end of the electronic device body 1000 refers to an end placed of a higher position of the electronic device body 1000 in a normal operation state.

According to the preferred embodiment, the axial line that a light opening of the wide-angle camera module 10, a light opening of the mid-focal length camera module 20, and a light opening of the long-focal length camera module 30 of the multi-aperture imaging system 1 are provided and disposed in the middle of the width direction of the mobile electronic device 100. In other words, it may divide the mobile electronic device 100 into two along the axial line that a light opening of the wide-angle camera module 10, a light opening of the mid-focal length camera module 20, and a light opening of the long-focal length camera module 30 of the multi-aperture imaging system 1 are provided.

Further, the position of the wide-angle camera module 10 is higher than the position of the mid-focal length camera module 20, and the position of the mid-focal length camera module 20 is higher than the position of the long-focal length camera module 30, such that the field of view of the wide-angle camera module 10 is close to the field of view of the mid-focal length camera module 20 and the field of view of the long-focal length camera module 30 is close to the field of view of the mid-focal length camera module 20. In other words, the long-focal length camera module 30 is arranged and positioned at a low end position of the mobile electronic device 100 and the long-focal length camera module 30 is mounted along a width direction of the mobile electronic device 100 on the electronic device body 1000.

In other words, the long-focal length camera module 30 is laterally mounted in the electronic device body 1000. The wide-angle camera module 10, the mid-focal length camera module 20 and the long-focal length camera module 30 are mounted in the electronic device body 1000 along a longitudinal direction.

Further, the mobile electronic device 100 comprises a flash 40 and a function module 50, wherein the function module 50 may be a focusing module, such as a laser focusing module and etc. The function module 50 is arranged in a side of the axial line that the light openings of the wide-angle camera module 10, the mid-focal length camera module 20 and the long-focal length camera module 30 are formed and is disposed adjacent to the mid-focal length camera module 20 in the electronic device body 1000 so as to assist the camera modules for a better photographing performance. Or, the distance between the function module 50 and the mid-focal length camera module 20 is shorter than the distance between the function module 50 and the wide-angle camera module 10 or the distance between the function module 50 and the long-focal length camera module 30. Alternatively, the function module 50 and the mid-focal length camera module 20 are mounted in the electronic device body 1000 in a parallel manner.

The flash 40 is positioned at the axial line that the wide-angle camera module 10 and the mid-focal length camera module 20 are provided and is positioned between the wide-angle camera module 10 and the mid-focal length camera module 20.

Alternatively, the flash 40 is positioned at a middle position between the wide-angle camera module 10 and the mid-focal length camera module 20 and is positioned at the axial line that the light openings of the wide-angle camera module 10 and the mid-focal length camera module 20 are formed.

In other words, the flash 40 is mounted adjacent to the wide-angle camera module 10 and the mid-focal length camera module 20 in the electronic device body 1000. Due to limited illumination scope of the flash 40, the flash 40 is more suitable in working with the wide-angle camera module 10 and the mid-focal length camera module 20 in order to achieve a better photographing performance than with the long-focal length camera module 30 of a deeper depth of field.

It is understandable that the focusing modules and the flash 40 may also be other function module. Namely, module types shall not be limited in the present invention.

The mobile electronic device 100 usually has a front camera module 4 arranged therein, wherein the front camera module 4 is positioned at the front side of the electronic device body 1000 so as for operations like self-portrait and etc. The front camera module 4 has to occupy more volume because of its functions of facial recognition and etc. The multi-aperture imaging system 1 arranged on the back side of the electronic device body 1000 is disposed at a position lower than the position of the front camera module, so as to reserve enough installation space for the front camera module 4.

FIG. 8A illustrates a first alternative arrangement of the multi-aperture imaging system 1 in the mobile electronic device 100 according to the above preferred embodiment of the present invention. A difference between this first alternative arrangement and the above preferred embodiment is the positions of the function module 50 and the flash 40 of the multi-aperture imaging system 1.

According to the first alternative arrangement of the preferred embodiment, the flash 40 and the function module 50 are arranged at the same side of the axial line that the wide-angle camera module 10, the mid-focal length camera module 20 and the long-focal length camera module 30 are provided, wherein the flash 40 is positioned at a middle position between the wide-angle camera module 10 and the mid-focal length camera module 20. Here, the middle position refers that the distance between the flash 40 and the wide-angle camera module 10 is equal to the distance between the flash 40 and the mid-focal length camera module 20. The function module 50 is positioned below the flash 40 and is at a position relatively closer to the mid-focal length camera module 20 than the wide-angle camera module 10 and the long-focal length camera module 30.

Alternatively, the function module 50 and the mid-focal length camera module 20 are mounted in the electronic device body 1000 in a parallel manner.

Alternatively, the flash 40 and the function module 50 are positioned at the same axial line, which is parallel to the axial line that the light openings of the wide-angle camera module 10, the mid-focal length camera module 20 and the long-focal length camera module 30 are provided.

FIG. 8B illustrates a second alternative arrangement of the multi-aperture imaging system 1 in the mobile electronic device 100 according to the above preferred embodiment of the present invention. The differences between this second alternative arrangement and the above preferred embodiment are related to the function module 50 and the flash 40 of the multi-aperture imaging system 1.

The flash 40 and the function module 50 are respectively positioned at the two sides of the axial line where the wide-angle camera module 10, the mid-focal length camera module 20, and the long-focal length camera module 30 are provided. Besides, the flash 40 and the function module 50 are respectively and symmetrically arranged at the axial line where the light openings of the wide-angle camera module 10, the mid-focal length camera module 20, and the long-focal length camera module 30 are formed, so as to provide a better photographing performance.

Further, the function module 50 is arranged at a middle position of the wide-angle camera module 10 and the mid-focal length camera module 20. In other words, the distance between the function module 50 and the wide-angle camera module 10 is equal to the distance between the function module 50 and the mid-focal length camera module 20.

FIG. 8C illustrates a third alternative arrangement of the multi-aperture imaging system 1 in the mobile electronic device 100 according to the above preferred embodiment of the present invention. Differences between this third alternative arrangement and the above preferred embodiment are related to the function module 50 and the flash 40 of the multi-aperture imaging system 1.

The flash 40 and the function module 50 are respectively positioned at the two sides of the axial line where the wide-angle camera module 10, the mid-focal length camera module 20, and the long-focal length camera module 30 are provided. Besides, the flash 40 and the function module 50 are respectively and symmetrically arranged at the axial line where the light openings of the wide-angle camera module 10, the mid-focal length camera module 20, and the long-focal length camera module 30 are formed, so as to provide a better photographing performance.

Further, the flash 40 is mounted adjacent to the mid-focal length camera module 20 in the electronic device body 1000. In other words, the distance between the flash 40 and the mid-focal length camera module 20 is shorter than the distance between the flash 40 and the wide-angle camera module 10 or shorter than the distance between the flash 40 and the long-focal length camera module 30.

As for the function module 50, the function module 50 is arranged adjacent to the mid-focal length camera module 20 in the electronic device body 1000. In other words, the distance between the function module 50 and the mid-focal length camera module 20 is shorter than the distance between the function module 50 and the wide-angle camera module 10 or shorter than the distance between the function module 50 and the long-focal length camera module 30.

Alternatively, the function module 50, the flash 40 and the mid-focal length camera module 20 are positioned at the same axial line, wherein the axial line is parallel to the width direction of the electronic device body 1000.

Figure 9B:
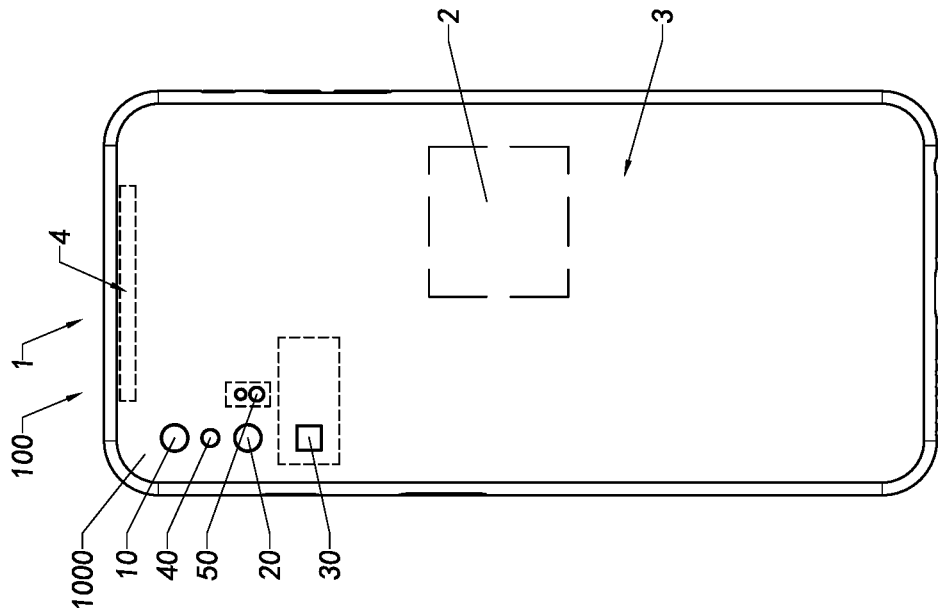
FIG. 9B is a plane view of an electronic device, illustrating a fifth alternative arrangement of the multi-aperture imaging system, according to the above preferred embodiment of the present invention.
Figure 9A:
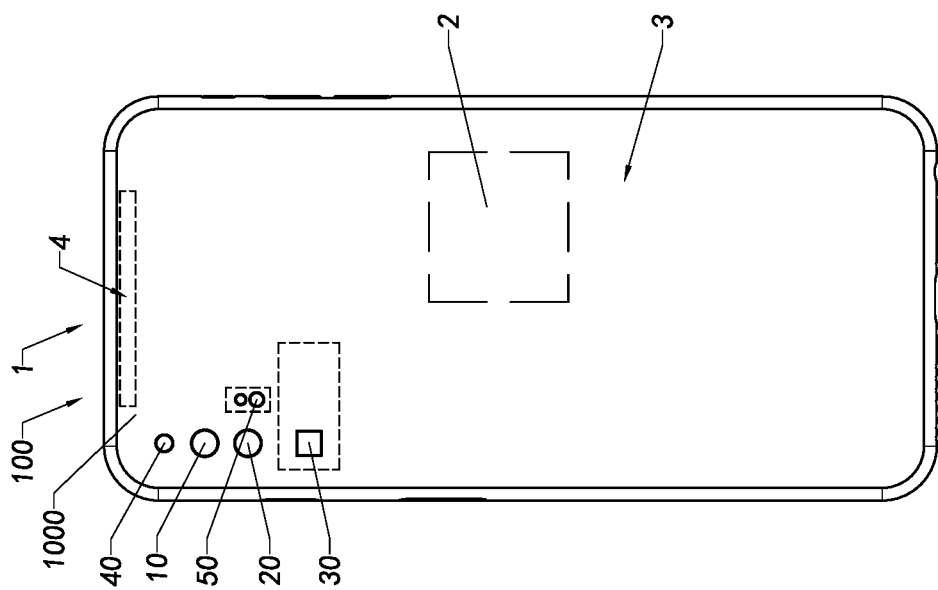
FIG. 9A is a plane view of an electronic device, illustrating a fourth alternative arrangement of the multi-aperture imaging system, according to the above preferred embodiment of the present invention.

FIG. 9A illustrates a fourth alternative arrangement of the multi-aperture imaging system 1 in the mobile electronic device 100 according to the above preferred embodiment of the present invention A difference between this fourth alternative arrangement and the above embodiment is the position of the multi-aperture imaging system 1.

The light openings of the wide-angle camera module 10, the mid-focal length camera module 20 and the long-focal length camera module 30 of the multi-aperture imaging system 1 are all arranged at an axial line, wherein the axial line is located on a side of the electronic device body 1000 of the mobile electronic device 100. In other words, the wide-angle camera module 10, the mid-focal length camera module 20 and the long-focal length camera module 30 are mounted near a long edge of the electronic device body 1000 on the electronic device body 1000.

In other words, the wide-angle camera module 10, the mid-focal length camera module 20 and the long-focal length camera module 30 are longitudinally mounted near by the edge of the electronic device body 1000 on the electronic device body 1000.

The long-focal length camera module 30 is laterally mounted in the electronic device body 1000. The flash 40 is positioned above the wide-angle camera module 10 and arranged at the same axial line with the light openings of the wide-angle camera module 10, the mid-focal length camera module 20, and the long-focal length camera module 30.

The function module 50 is arranged adjacent to the mid-focal length camera module 20. Specifically, it is mounted in the electronic device body 1000 and positioned in the inner side of the mid-focal length camera module 20 along the lateral direction of the mid-focal length camera module 20.

FIG. 9B illustrates a fifth alternative arrangement of the above preferred embodiment. A difference between this fifth alternative arrangement and the above embodiment is the position of the flash 40.

The flash 40 and the light openings of the wide-angle camera module 10, the mid-focal length camera module 20 and the long-focal length camera module 30 are all positioned at the same axial line. Besides, the flash 40 is positioned between the wide-angle camera module 10 and the mid-focal length camera module 20. In other words, the flash 40 is arranged closer to the wide-angle camera module 10 and the mid-focal length camera module 20 relatively with the long-focal length camera module 30.

The function module 50 is arranged adjacent to the mid-focal length camera module 20. In other words, the distance between the function module 50 and the mid-focal length camera module 20 is shorter than the distance between the function module 50 and the wide-angle camera module 10 or the distance between the function module 50 and the long-focal length camera module 30.

Alternatively, the function module 50 and the mid-focal length camera module 20 are laterally mounted in the electronic device body 1000.

FIG. 10A illustrates a sixth alternative arrangement of the multi-aperture imaging system 1 in the mobile electronic device 100 according to the above preferred embodiment of the present invention.

According to the sixth alternative arrangement, the multi-aperture imaging system 1 is mounted on the other side of the electronic device body 1000, wherein if it is called the left side in FIGS. 9A and 9B, then it will be mounted on the right side of the electronic device body 1000.

All of the camera modules of the multi-aperture imaging system 1 are longitudinally mounted on the electronic device body 1000

Specifically speaking, the wide-angle camera module 10, the mid-focal length camera module 20 and the long-focal length camera module 30 are mounted and arranged in a top-down manner along the length direction of the mobile electronic device 100 on the electronic device body 1000. Besides, light openings of the wide-angle camera module 10, the mid-focal length camera module 20 and the long-focal length camera module 30 are positioned at the same axial line. The length direction of the long-focal length camera module 30 is perpendicular to the length direction of the mobile electronic device 100 and the long-focal length camera module 30 is arranged in the manner of being inwardly extended from the axial line that the light opening is at.

In other words, the wide-angle camera module 10, the mid-focal length camera module 20 and the long-focal length camera module 30 are longitudinally mounted near by the edge of the electronic device body 1000 on the electronic device body 1000.

The long-focal length camera module 30 is laterally mounted in the electronic device body 1000. The flash 40 is positioned above the wide-angle camera module 10 and arranged at the same axial line with the light openings of the wide-angle camera module 10, the mid-focal length camera module 20, and the long-focal length camera module 30.

The function module 50 is arranged adjacent to the mid-focal length camera module 20. Specifically, it is mounted in the electronic device body 1000 and positioned in the inner side of the mid-focal length camera module 20 in a parallel manner to the mid-focal length camera module 20.

FIG. 10B illustrates a seventh alternative arrangement of the above preferred embodiment. A difference between this seventh alternative arrangement and the above embodiment is the position of the flash 40.

The flash 40 and the light openings of the wide-angle camera module 10, the mid-focal length camera module 20 and the long-focal length camera module 30 are all positioned at the same axial line. Besides, the flash 40 is positioned between the wide-angle camera module 10 and the mid-focal length camera module 20. In other words, the flash 40 is arranged closer to the wide-angle camera module 10 and the mid-focal length camera module 20 relatively with the long-focal length camera module 30.

The function module 50 is arranged adjacent to the mid-focal length camera module 20. In other words, the distance between the function module 50 and the mid-focal length camera module 20 is shorter than the distance between the function module 50 and the wide-angle camera module 10 or the distance between the function module 50 and the long-focal length camera module 30.

Alternatively, the function module 50 and the mid-focal length camera module 20 are laterally mounted in the electronic device body 1000.

Figure 11:
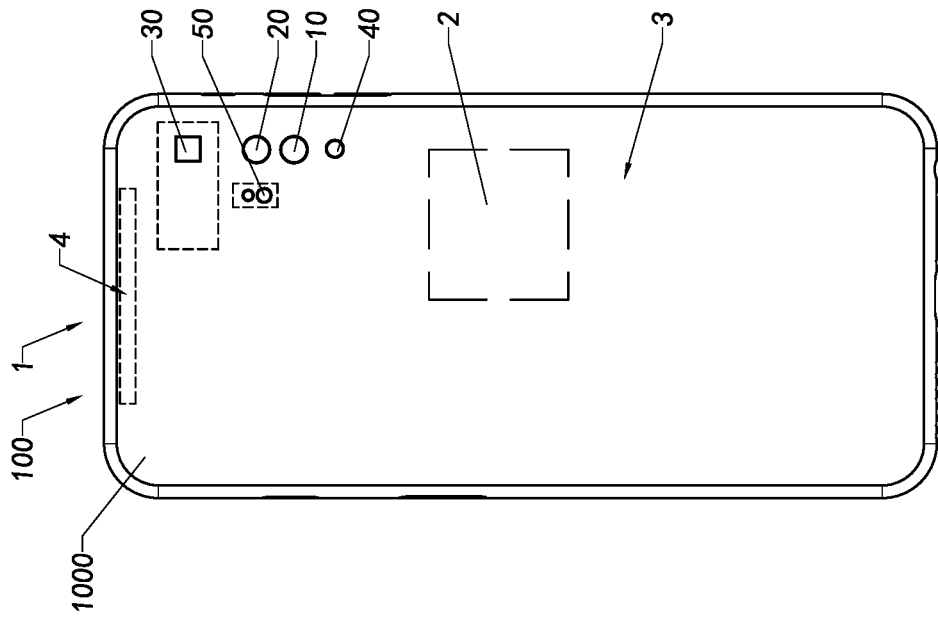
FIG. 11 is a plane view of an electronic device, illustrating an eighth alternative arrangement of the multi-aperture imaging system, according to the above preferred embodiment of the present invention.

FIG. 11 illustrates an eighth alternative arrangement of the multi-aperture imaging system 1 in the mobile electronic device 100 according to the above preferred embodiment of the present invention. A difference between this eighth alternative arrangement and the above preferred embodiment is the position of the multi-aperture imaging system 1.

The multi-aperture imaging system 1 comprises the wide-angle camera module 10, the mid-focal length camera module 20 and the long-focal length camera module 30, wherein the long-focal length camera module 30, the mid-focal length camera module 20 and the wide-angle camera module 10 are successively arranged along the length direction of the electronic device body 1000. The position of the long-focal length camera module 30 is higher than the position of the mid-focal length camera module 20, whereas the position of the mid-focal length camera module 20 is higher than the position of the wide-angle camera module 10. The long-focal length camera module 30 is mounted along the width direction of the electronic device body 1000 in the electronic device body 1000. Or, the long-focal length camera module 30 is laterally mounted in the electronic device body 1000.

The light openings position of the wide-angle camera module 10, the mid-focal length camera module 20 and the long-focal length camera module 30 are all arranged at the same axial line, wherein the axial line is located on the left side of the electronic device body 1000.

The flash 40 is positioned below the wide-angle camera module 10. Besides, the flash 40 and the light openings of the wide-angle camera module 10, the mid-focal length camera module 20 and the long-focal length camera module 30 are at the same axial line.

The function module 50 is arranged in the inner side of the axial line that the light openings of the long-focal length camera module 30, the mid-focal length camera module 20 and the wide-angle camera module 10 are formed and the function module 50 is disposed adjacent to the mid-focal length camera module 20 in the electronic device body 1000.

Alternatively, the function module 50 and the mid-focal length camera module 20 are mounted in the electronic device body 1000 in a parallel manner. The distance between the function module 50 and the mid-focal length camera module 20 is shorter than the distance between the function module 50 and the wide-angle camera module 10 or shorter than the distance between the function module 50 and the long-focal length camera module 10.

Figure 12:
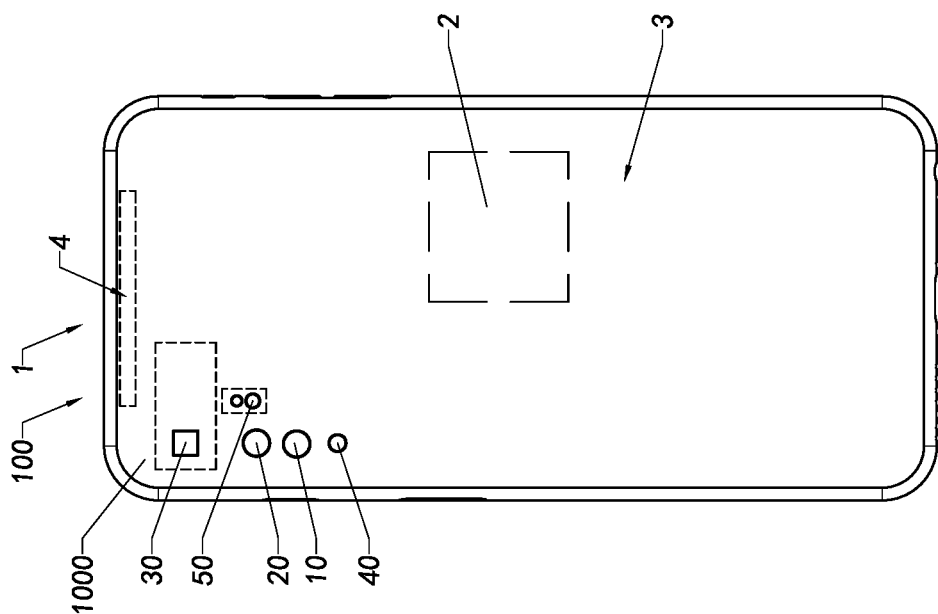
FIG. 12 is a plane view of an electronic device, illustrating an ninth alternative arrangement of the multi-aperture imaging system, according to the above preferred embodiment of the present invention.

FIG. 12 illustrates a ninth alternative arrangement of the multi-aperture imaging system 1 in the mobile electronic device 100 according to the above preferred embodiment of the present invention.

A difference between this ninth alternative arrangement and the above preferred embodiment is the position of the multi-aperture imaging system 1.

If the multi-aperture imaging system 1 is positioned on the left side of the electronic device body 1000 in the above preferred embodiment, then the multi-aperture imaging system 1 will be positioned on the right side of the electronic device body 1000 according to this ninth alternative arrangement.

The long-focal length camera module 30, the mid-focal length camera module 20 and the wide-angle camera module 10 are mounted and arranged along the length direction of the electronic device body 1000 successively in the electronic device body 1000. Besides, the light openings of the long-focal length camera module 30, the mid-focal length camera module 20, and the wide-angle camera module 10 are positioned at the same axial line. In other words, the long-focal length camera module 30, the mid-focal length camera module 20 and the wide-angle camera module 10 are mounted in the electronic device body 1000 successively and longitudinally.

The long-focal length camera module 30 is laterally mounted in the electronic device body 1000. Besides, the position of the long-focal length camera module 30 is higher than the position of the mid-focal length camera module 20, whereas the position of the mid-focal length camera module 20 is higher than the position of the wide-angle camera module 10.

The flash 40 and the light openings of the long-focal length camera module 30, the mid-focal length camera module 20 and the wide-angle camera module 10 are all positioned at the same axial line. Besides, the position of the flash 40 is slightly lower than the position of the wide-angle camera module 10. In other words, the flash 40 is mounted adjacent to the wide-angle camera module 10 on the electronic device body 1000.

The function module 50 is positioned in the inner side of the axial line that the long-focal length camera module 30, the mid-focal length camera module 20, the wide-angle camera module 10, and the flash 40 are provided.

Alternatively, the function module 50 is mounted adjacent to the mid-focal length camera module 20 on the electronic device body 1000. The distance between the function module 50 and the mid-focal length camera module 20 is respectively shorter than the distance between the function module 50 and the wide-angle camera module 10 and the distance between the function module 50 and the long-focal length camera module 30.

Figure 13B:
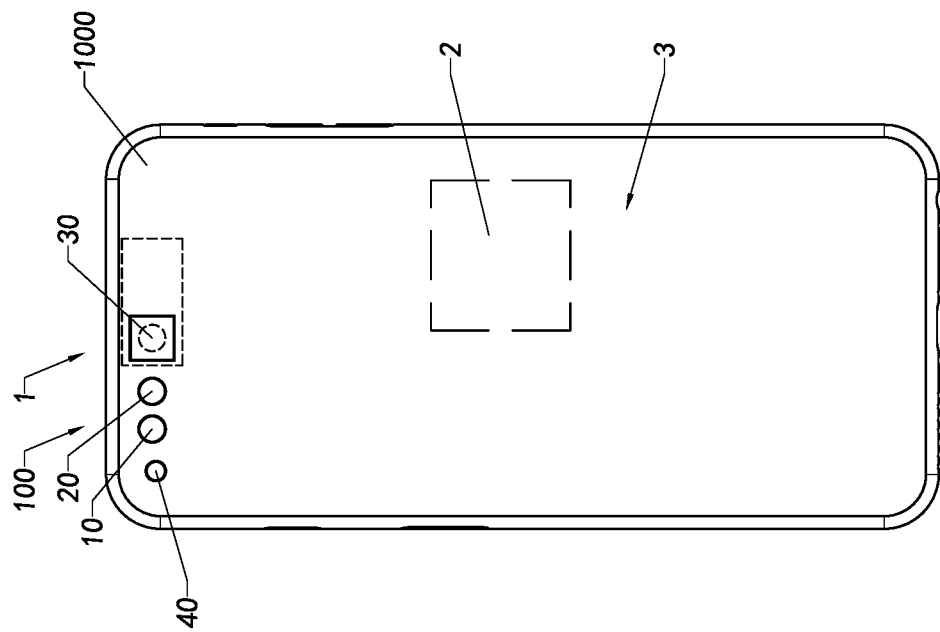
FIG. 13B is a plane view of an electronic device, illustrating an eleventh alternative arrangement of the multi-aperture imaging system, according to the above preferred embodiment of the present invention.
Figure 13A:
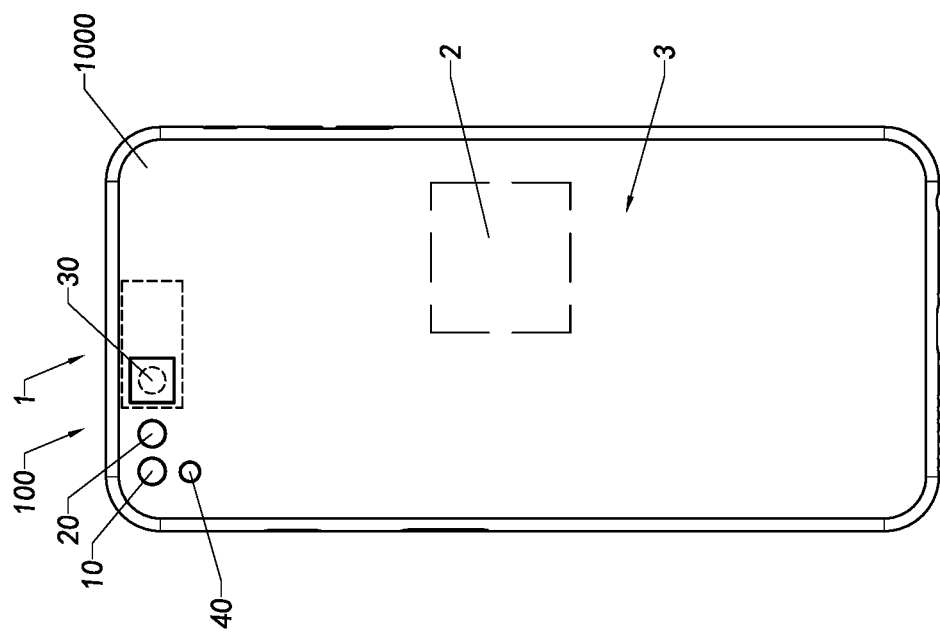
FIG. 13A is a plane view of an electronic device, illustrating a tenth alternative arrangement of the multi-aperture imaging system, according to the above preferred embodiment of the present invention.

Referring to FIG. 13A, a tenth alternative arrangement of the multi-aperture imaging system 1 in a mobile electronic device 100 according to the above preferred embodiment of the present invention is illustrated.

The mobile electronic device 100 comprises an electronic device body 1000, a front camera module 4 and a multi-aperture imaging system 1, wherein the electronic device body 1000 has a front side adapted for facing the user and a back side opposite to the user. The front camera module 4 is positioned on the front side of the electronic device body 1000, whereas the multi-aperture imaging system 1 is positioned on the back side of the electronic device body 1000. As the front camera module 4 occupies less space, the camera modules of the multi-aperture imaging system 1 may be arranged and mounted along the width direction of the mobile electronic device 100 on the electronic device body 1000, so as to achieve a better photographing performance.

The wide-angle camera module 10, the mid-focal length camera module 20 and the long-focal length camera module 30 are successively arranged in the electronic device body 1000 along a lateral direction. Further, a light opening of the wide-angle camera module 10, a light opening of the mid-focal length camera module 20, and a light opening of the long-focal length camera module 30 are positioned at the same axial line and parallel to the width direction of the mobile electronic device 100. The long-focal length camera module 30 is laterally mounted in the electronic device body 1000.

The long-focal length camera module 30 is mounted in the electronic device body 1000 at a more inner position relatively with the positions of the wide-angle camera module 10 and the mid-focal length camera module. The length direction of a photosensitive element of the long-focal length camera module 30 is parallel to the length direction of the mobile electronic device 100.

The multi-aperture imaging system 1 further comprises a flash 40, which is arranged below the wide-angle camera module 10 and the axial line where the flash 40 and the wide-angle camera module 10 are at is parallel to the length direction of the mobile electronic device 100. In other words, the flash 40 and the wide-angle camera module 10 are mounted along the length direction of the mobile electronic device 100 in the electronic device body 1000. Certainly, there may be a focusing module mounted at the position of the flash 40.

The electronic device body 1000 comprises a processing unit 2 and a display unit 3, wherein the processing unit 2 is communicationally connected with the display unit 3 and the multi-aperture imaging system 1 is operationally connected with the processing unit 2.

FIG. 13B illustrates an eleventh alternative arrangement of the multi-aperture imaging system 1 in the mobile electronic device 100 according to the above preferred embodiment of the present invention.

A difference between this eleventh alternative arrangement and the above preferred embodiment is the position of the multi-aperture imaging system 1.

The wide-angle camera module 10, the mid-focal length camera module 20 and the long-focal length camera module 30 of the multi-aperture imaging system 1 are successively mounted in the electronic device body 1000 along the width direction of the mobile electronic device 100.

The long-focal length camera module 30 is laterally mounted in the electronic device body 1000. The light openings of the wide-angle camera module 10, the mid-focal length camera module 20, and the long-focal length camera module 30 are positioned at the same axial line.

The flash 40 and the light openings of the wide-angle camera module 10, the mid-focal length camera module 20 and the long-focal length camera module 30 are all positioned at the same axial line. Besides, the flash 40 is arranged in the electronic device body 1000 adjacent to the wide-angle camera module 10.

Figure 13C:
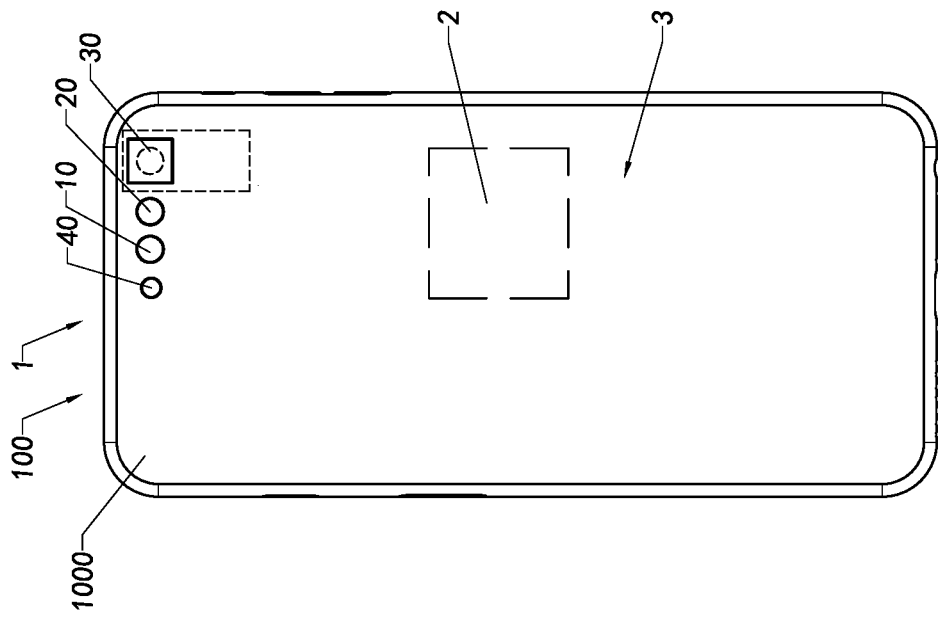
FIG. 13C is a plane view of an electronic device, illustrating a twelfth alternative arrangement of the multi-aperture imaging system, according to the above preferred embodiment of the present invention.

FIG. 13C illustrates a twelfth alternative arrangement of the multi-aperture imaging system 1 in the mobile electronic device 100 according to the above preferred embodiment of the present invention.

A difference between this twelfth alternative arrangement and the above preferred embodiment is the position of the multi-aperture imaging system 1.

The wide-angle camera module 10, the mid-focal length camera module 20 and the long-focal length camera module 30 of the multi-aperture imaging system 1 are successively mounted in the electronic device body 1000 along the width direction of the mobile electronic device 100.

The long-focal length camera module 30 is laterally mounted in the electronic device body 1000. The light openings of the wide-angle camera module 10, the mid-focal length camera module 20, and the long-focal length camera module 30 are positioned at the same axial line.

The flash 40 and the light openings of the wide-angle camera module 10, the mid-focal length camera module 20 and the long-focal length camera module 30 are all positioned at the same axial line. Besides, the flash 40 is arranged in the electronic device body 1000 adjacent to the wide-angle camera module 10 and the mid-focal length camera module 20.

According to the preferred embodiment, the flash 40 is arranged at a middle position of the wide-angle camera module 10 and the mid-focal length camera module 20.

Figure 13D:
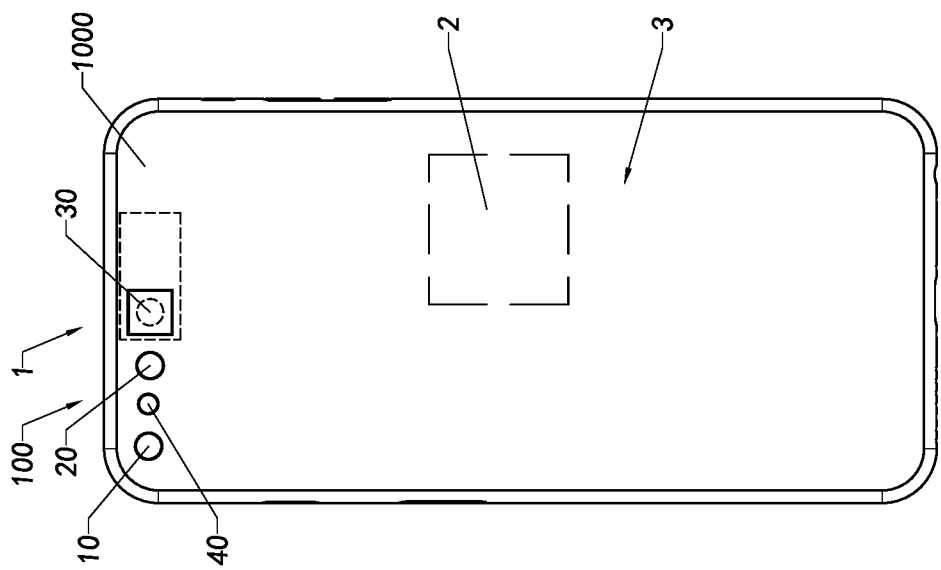
FIG. 13D is a plane view of an electronic device, illustrating a thirteen alternative arrangement of the multi-aperture imaging system, according to the above preferred embodiment of the present invention.

FIG. 13D illustrates a thirteen alternative arrangement of the multi-aperture imaging system 1 in the mobile electronic device 100 according to the above preferred embodiment of the present invention.

A difference between this thirteen alternative arrangement and the above preferred embodiment is the position of the multi-aperture imaging system 1.

The wide-angle camera module 10, the mid-focal length camera module 20 and the long-focal length camera module 30 of the multi-aperture imaging system 1 are successively mounted in the electronic device body 1000 along the width direction of the electronic device body 1000.

The long-focal length camera module 30 is longitudinally arranged in the electronic device body 1000 and adjacent to a side of the electronic device body 1000. The light openings of the wide-angle camera module 10, the mid-focal length camera module 20, and the long-focal length camera module 30 are all positioned at the same axial line. Besides, the wide-angle camera module 10 is mounted adjacent to the middle position of the width direction of the electronic device body 1000 in the electronic device body 1000.

The length direction of the long-focal length camera module 30 is parallel to the length direction of the mobile electronic device 100. The length direction of a photosensitive element of the long-focal length camera module 30 is perpendicular to the length direction of the mobile electronic device 100.

The length direction of the long-focal length camera module 30 is parallel to the length direction of the mobile electronic device 100. The length direction of a photosensitive element of the long-focal length camera module 30 is perpendicular to the length direction of the mobile electronic device 100.

According to another aspect of the present invention, an installation method of multi-aperture imaging system is provided, which comprises the following steps:

mounting a camera body of a wide-angle camera module on a connection element of a long-focal length camera module, wherein a field of view FOV3 of the long-focal length camera module is smaller than a field of view FOV1 of the wide-angle camera module.

According to one embodiment of the present invention, the installation method further comprises a step of:

mounting a camera body of a mid-focal length camera module so as to coordinate operations of the wide-angle camera module, the mid-focal length camera module and the long-focal length camera module, wherein a field of view FOV2 of the mid-focal length camera module is larger than the field of view FOV3 of the long-focal length camera module and the field of view area of the field of view FOV3 is partially overlapped with portion of the field of view area of the field of view FOV2, while the field of view area of the field of view FOV2 is partially overlapped with portion of the field of view area of the field of view FOV1.

According to one embodiment of the present invention, the long-focal length camera module is a periscope camera module.

According to another aspect of the present invention, an installation method of multi-aperture imaging system is provided, which comprises the following steps:

mounting a camera body of a wide-angle camera module on a connection element of a mid-focal length camera module, wherein a field of view FOV1 of the wide-angle camera module is larger than a field of view FOV2 of the mid-focal length camera module, and the field of view area of the field of view FOV1 is partially overlapped with portion of the field of view area of the field of view FOV2.

According to one embodiment of the present invention, the installation method further comprises a step of:

mounting a camera body of a long-focal length camera module so as to coordinate operations of the wide-angle camera module, the mid-focal length camera module, and the long-focal length camera module, wherein a field of view FOV3 of the long-focal length camera module is smaller than the field of view FOV2 of the mid-focal length camera module, and the field of view area of the field of view FOV3 is partially overlapped with portion of the field of view area of the field of view FOV2.

Those skilled in the art shall understand that the above mentioned embodiments of the present invention in the descriptions and figures are to give examples, but to confine the present invention. Objectives of the present invention are completely and effectively implemented. Notions of the functions and structures of the present invention have been shown and described in the embodiments, whereas implementations of the present invention may have modifications or changes in any ways without going against the above notions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-aperture imaging system for an electronic device, comprising:

a first camera module having at least one lens and an angular field of view: FOV1, as a wide-angle length camera module, a second camera module having at least one lens and an angular field of view: FOV2, as a mid-focal length camera module, and a third camera module having at least one lens and an angular field of view: FOV3, as a long-focal length camera module, wherein said first camera module, said second camera module and said third camera module are provided on a plane perpendicular to an optical axis thereof, and operated coordinately to achieve photographing performances of a predetermined number of depths of field through focal lengths of said first, second and third camera modules, and arranged in such a manner that said FOV1>said FOV2>said FOV3, and a portion of a field of view area of said FOV1 is covered by a portion of a field of view area of said FOV2, while a portion of a field of view area of said FOV2 is covered by a portion of a field of view area of said FOV3, and the field of view area of said FOV1, the field of view area of said FOV2 and the field of view area of said FOV3 do not completely overlap but begin to be overlapped at a position distanced from an end surface of said camera modules.

2. The multi-aperture imaging system, as recited in claim 1, wherein each of said FOV1, said FOV2, and said FOV3 satisfies the following conditions:

10°≤said FOV3≤40°, 25°≤said FOV2≤90°, and 50°≤said FOV1≤180°.

3. The multi-aperture imaging system, as recited in claim 1, wherein at a position distanced from an end surface of said at least one lens of said first camera module of ≥5 cm, said field of view area of said FOV3 is at least partially covered and included by said field of view area of said FOV2.

4. The multi-aperture imaging system, as recited in claim 2, wherein at a position distanced from an end surface of said at least one lens of said first camera module of ≥5 cm, said field of view area of said FOV3 is at least partially covered and included by said field of view area of said FOV2.

5. The multi-aperture imaging system, as recited in claim 1, wherein at a position distanced from said end surface of said at least one lens of said first camera module of ≥20 cm, a center of a section of said field of view area of said second camera module and a center of a section of said field of view area of said first camera module are coincided.

6. The multi-aperture imaging system, as recited in claim 2, wherein at a position distanced from said end surface of said at least one lens of said first camera module of ≥20 cm, a center of a section of said field of view area of said second camera module and a center of a section of said field of view area of said first camera module are coincided.

7. The multi-aperture imaging system, as recited in claim 3, wherein at a position distanced from said end surface of said at least one lens of said first camera module of ≥20 cm, a center of a section of said field of view area of said second camera module and a center of a section of said field of view area of said first camera module are coincided.

8. The multi-aperture imaging system, as recited in claim 4, wherein at a position distanced from said end surface of said at least one lens of said first camera module of ≥20 cm, a center of a section of said field of view area of said second camera module and a center of a section of said field of view area of said first camera module are coincided.

9. The multi-aperture imaging system, as recited in claim 1, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

10. The multi-aperture imaging system, as recited in claim 2, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

11. The multi-aperture imaging system, as recited in claim 3, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

12. The multi-aperture imaging system, as recited in claim 4, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

13. The multi-aperture imaging system, as recited in claim 5, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

14. The multi-aperture imaging system, as recited in claim 6, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

15. The multi-aperture imaging system, as recited in claim 7, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

16. The multi-aperture imaging system, as recited in claim 8, wherein at a position distanced from said end surface of said at least one lens of said first camera module of ≥20 cm, a radius of said field of view area of said second camera module is R2 and a distance between an optical axis of said second camera module and an optical axis of said first camera module is I2, wherein I2/R2≤0.125.

17. The multi-aperture imaging system, as recited in claim 1, wherein a distance between an optical axis of said second camera module and an optical axis of said third camera module is said I2, wherein 1 cm≤said I2≤3 cm.

18. The multi-aperture imaging system, as recited in claim 1, wherein at a position distanced from an end surface of said at least one lens of said second camera module of ≤3 cm, a field of view area of said FOV2 is at least partially covered and included by a field of view area of said FOV1.

19. The multi-aperture imaging system, as recited in claim 1, wherein at a position distanced from an end surface of said at least one lens of said second camera module of ≤10 cm, a center of a section of a field of view area of said first camera module and a center of a section of a field of view area of said second camera module are coincided.

20. The multi-aperture imaging system, as recited in claim 1, wherein at a position distanced from an end surface of said at least one lens of said third camera module of ≥10 cm, a radius of a field of view area of said first camera module that is R1 and a distance between an optical axis of said second camera module and an optical axis of said first camera module is I1, wherein I1/R1≤0.125.

21. The multi-aperture imaging system, as recited in claim 1, wherein a ratio of equivalent focal lengths of said third camera module and said first camera module is ≥4.

22. The multi-aperture imaging system, as recited in claim 1, wherein a ratio of an equivalent focal length of said second camera module and an equivalent focal length of said first camera module is ≥3.

\* \* \* \* \*